US010425907B2

(12) United States Patent
Wu et al.

(10) Patent No.: US 10,425,907 B2
(45) Date of Patent: Sep. 24, 2019

(54) PARAMETER DETERMINING METHOD, BASE STATION, AND USER EQUIPMENT

(71) Applicant: Huawei Technologies Co., Ltd., Shenzhen (CN)

(72) Inventors: Ning Wu, Shanghai (CN); Zhongfeng Li, Munich (DE); Yi Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/206,180

(22) Filed: Nov. 30, 2018

(65) Prior Publication Data

US 2019/0098591 A1 Mar. 28, 2019

Related U.S. Application Data

(63) Continuation of application No. PCT/CN2017/102581, filed on Sep. 21, 2017.

(30) Foreign Application Priority Data

Sep. 29, 2016 (CN) .......................... 2016 1 0872508

(51) Int. Cl.
*H04W 56/00* (2009.01)
*H04W 76/11* (2018.01)
(Continued)

(52) U.S. Cl.
CPC ......... *H04W 56/001* (2013.01); *H04L 5/0007* (2013.01); *H04L 5/0091* (2013.01);
(Continued)

(58) Field of Classification Search
None
See application file for complete search history.

(56) References Cited

U.S. PATENT DOCUMENTS

2012/0188961 A1 7/2012 Suzuki et al.
2015/0195814 A1 7/2015 Li et al.
(Continued)

FOREIGN PATENT DOCUMENTS

CN 101686434 A 3/2010
CN 102299892 A 12/2011
(Continued)

OTHER PUBLICATIONS

NTT Docomo, Inc., "Outcome of offline discussion," 3GPP TSG RAN WG1 meeting #86 R1-167946, Gothenburg, Sweden, Aug. 22-26, 2016, 2 pages.
(Continued)

*Primary Examiner* — Mohammad S Adhami
(74) *Attorney, Agent, or Firm* — Slater Matsil, LLP

(57) ABSTRACT

Embodiments of this application provide a parameter determining method, a base station, and user equipment. The parameter determining method provided in this application includes: determining, by a base station, a first subcarrier spacing corresponding to UE; and notifying, by the base station, the UE of the first subcarrier spacing. In the embodiments of this application, the UE may accurately learn of, in a multi-subcarrier-spacing system, a subcarrier spacing used for data transmission, and then perform data transmission. This can effectively ensure that the UE performs a corresponding service, thereby meeting a corresponding service requirement.

19 Claims, 7 Drawing Sheets

(51) Int. Cl.
*H04L 27/26* (2006.01)
*H04W 72/04* (2009.01)
*H04L 5/00* (2006.01)

(52) U.S. Cl.
CPC ......... *H04L 27/2607* (2013.01); *H04W 72/04* (2013.01); *H04W 72/0453* (2013.01); *H04W 76/11* (2018.02); *H04L 5/0048* (2013.01)

(56) References Cited

U.S. PATENT DOCUMENTS

| | | | | |
|---|---|---|---|---|
| 2015/0256308 | A1 | 9/2015 | Ma et al. | |
| 2016/0044623 | A1 | 2/2016 | Chung et al. | |
| 2017/0181149 | A1* | 6/2017 | Ang | H04L 5/003 |
| 2017/0201968 | A1* | 7/2017 | Nam | H04W 4/70 |
| 2017/0272895 | A1* | 9/2017 | Park | H04W 4/70 |
| 2017/0311326 | A1* | 10/2017 | Wong | H04W 72/0453 |
| 2017/0353257 | A1* | 12/2017 | Islam | H04J 3/0617 |
| 2018/0249513 | A1* | 8/2018 | Chang | H04B 7/26 |
| 2019/0098591 | A1 | 3/2019 | Wu et al. | |

FOREIGN PATENT DOCUMENTS

| | | | |
|---|---|---|---|
| CN | 102474885 | A | 5/2012 |
| CN | 102740375 | A | 10/2012 |
| CN | 105979597 | A | 9/2016 |
| CN | 106063353 | A | 10/2016 |
| CN | 107889236 | A | 4/2018 |
| WO | 2014043922 | A1 | 3/2014 |
| WO | 2015131827 | A1 | 9/2015 |
| WO | 2016130175 | A1 | 8/2016 |

OTHER PUBLICATIONS

Panasonic, "Use of multiple numerologies in NR," 3GPP TSG RAN WG1 Meeting #86, R1-167439, Gothenburg, Sweden Aug. 22-26, 2016, 10 pages.

* cited by examiner

PARAMETER DETERMINING METHOD, BASE STATION, AND USER EQUIPMENT

CROSS-REFERENCE TO RELATED APPLICATIONS

This application is a continuation of International Application No. PCT/CN2017/102581, filed on Sep. 21, 2017, which claims priority to Chinese Patent Application No. 201610872508.X, filed on Sep. 29, 2016. The disclosures of the aforementioned applications are hereby incorporated by reference in their entireties.

TECHNICAL FIELD

Embodiments of this application relate to communications technologies, and in particular, to a parameter determining method, a base station, and user equipment.

BACKGROUND

A plurality of services are defined in a 5G technology, for example, an enhanced mobile broadband (eMBB) service, a massive machine type communications (mMTC) service, an ultra-reliable and low latency communications (URLLC) service, and a positioning service.

Different services have different quality of service (QoS) requirements. For example, different services have different latency requirements and reliability requirements. As such, different services are corresponding to different parameters. In addition, a physical layer channel in the 5G technology mainly includes a plurality of channel types, such as a control channel, a data channel, and a reference signal. Because types and latency requirements of signals transmitted on different types of channels are different, different channels are also corresponding to different subcarrier spacings.

In conclusion, different subcarrier spacings need to be used for both different services on a same channel and different channels of a same service. Consequently, a plurality of subcarrier spacings may exist in a communications system for one UE, and how to accurately determine a subcarrier spacing used for data transmission is extremely important.

SUMMARY

Embodiments of this application provide a parameter determining method, a base station, and user equipment, to determine, for UE in a multi-subcarrier-spacing system, a subcarrier spacing used for data transmission.

According to a first aspect, an embodiment of this application provides a parameter determining method, including: determining, by a base station, a first subcarrier spacing corresponding to user equipment UE; and notifying, by the base station, the UE of the first subcarrier spacing.

Optionally, before the determining, by a base station, a first subcarrier spacing corresponding to UE, the method further includes: receiving, by the base station, a random access channel sent by the UE, where the random access channel is a channel sent by the UE by using a second subcarrier spacing; and determining, by the base station based on the second subcarrier spacing, the first subcarrier spacing corresponding to the UE.

Optionally, before the determining, by a base station, a first subcarrier spacing corresponding to UE, the method further includes: receiving, by the base station, a request sent by the UE, where the request includes indication information corresponding to a subcarrier spacing requested by the UE; and determining, by the base station based on the indication information corresponding to the subcarrier spacing requested by the UE, the first subcarrier spacing corresponding to the UE.

Optionally, the determining, by a base station, a first subcarrier spacing corresponding to UE includes: determining, by the base station based on a reference signal measurement value corresponding to at least one subcarrier spacing, the first subcarrier spacing corresponding to the UE.

Optionally, the method further includes: determining, by the base station based on a reference signal measurement value corresponding to at least one cyclic prefix CP type, a CP type corresponding to the UE; and notifying, by the base station, the UE of the CP type corresponding to the UE.

Optionally, before the determining, by the base station based on a reference signal measurement value corresponding to at least one subcarrier spacing, the first subcarrier spacing corresponding to the UE, the method further includes: receiving, by the base station, at least one of the reference signal measurement value corresponding to the at least one subcarrier spacing, wherein the at least one of the reference signal measurement value is sent by the UE.

Optionally, before the receiving, by the base station, the reference signal measurement value that is corresponding to the at least one subcarrier spacing and that is sent by the UE, the method further includes: sending, by the base station to the UE, a reference signal corresponding to the at least one subcarrier spacing.

Optionally, before the determining, by the base station based on a reference signal measurement value corresponding to at least one subcarrier spacing, the first subcarrier spacing corresponding to the UE, the method further includes: detecting, by the base station, a reference signal corresponding to each subcarrier spacing in the at least one subcarrier, to obtain a reference signal measurement value corresponding to each subcarrier spacing.

Optionally, before the detecting, by the base station, a reference signal corresponding to each subcarrier spacing, to obtain a reference signal measurement value corresponding to each subcarrier spacing, the method further includes: receiving, by the base station, the reference signal that is corresponding to each subcarrier spacing and that is sent by the UE.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the determining, by a base station, a first subcarrier spacing corresponding to UE includes: determining, by the base station based on a third subcarrier spacing and a relationship between the third subcarrier spacing and the first subcarrier spacing, the first subcarrier spacing corresponding to the UE, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the notifying, by the base station, the UE of the first subcarrier spacing includes: notifying, by the base station by using signaling carried in a broadcast channel, the UE that the first subcarrier spacing is the subcarrier spacing used for a data channel; or notifying, by the base station by using signaling carried in a broadcast channel or system information, the UE that the first subcarrier spacing is the subcarrier spacing used for a control channel or the subcarrier spacing used for a random access channel; or notifying, by the base station by using higher layer signaling, the UE that the first subcarrier spacing is the subcarrier spacing used for a control channel, a data channel, or a reference signal; or notifying, by the base station by using signaling carried in a control channel, the UE that the first subcarrier spacing is the parameter used for a data channel and/or the subcarrier spacing used for a reference signal.

Optionally, the notifying, by the base station, the UE of the first subcarrier spacing includes: notifying, by the base station, the UE of the first subcarrier spacing by sending at least one piece of the following information to the UE: a value of the first subcarrier spacing; a relative relationship between the first subcarrier spacing and a current subcarrier spacing of the UE; a relative relationship between the first subcarrier spacing and a common reference subcarrier spacing; and a relative relationship between the first subcarrier spacing and a subcarrier spacing used for a preset channel.

Optionally, the method further includes: notifying, by the base station, the UE of effective time of the first subcarrier spacing and/or an effective channel of the first subcarrier spacing.

According to a second aspect, an embodiment of this application further provides a parameter determining method, including: obtaining, by user equipment UE, a first subcarrier spacing notified by a base station; and performing, by the UE, data transmission with the base station based on the first subcarrier spacing.

Optionally, before the obtaining, by UE, a first subcarrier spacing notified by a base station, the method further includes: sending, by the UE, a random access channel to the base station by using a second subcarrier spacing, so that the base station determines the first subcarrier spacing based on the second subcarrier spacing.

Optionally, before the obtaining, by UE, a first subcarrier spacing notified by a base station, the method further includes: sending, by the UE, a request to the base station, where the request includes indication information corresponding to a subcarrier spacing requested by the UE, and the request is used by the base station to determine the first subcarrier spacing based on the indication information corresponding to the subcarrier spacing requested by the UE.

Optionally, the first subcarrier spacing is a subcarrier spacing determined by the base station based on a reference signal measurement value corresponding to at least one subcarrier spacing.

Optionally, the method further includes: obtaining, by the UE, a cyclic prefix CP type notified by the base station, where the CP type is a CP type determined by the base station based on a reference signal measurement value corresponding to at least one CP type.

Optionally, before the obtaining, by UE, a first subcarrier spacing notified by a base station, the method further includes: sending, by the UE to the base station, at least one of the reference signal measurement value corresponding to the at least one subcarrier spacing.

Optionally, before the sending, by the UE to the base station, the reference signal measurement value corresponding to the at least one subcarrier spacing, the method further includes: receiving, by the UE, a reference signal that is corresponding to the at least one subcarrier spacing and that is sent by the base station.

Optionally, a reference signal measurement value corresponding to each subcarrier spacing in the at least one subcarrier spacing is obtained by detecting, by the base station, a reference signal corresponding to each subcarrier spacing.

Optionally, before the sending, by the UE to the base station, the reference signal measurement value corresponding to the at least one subcarrier spacing, the method further includes: sending, by the UE to the base station, a reference signal corresponding to the at least one subcarrier spacing.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the first subcarrier spacing is a subcarrier spacing determined by the base station based on a third subcarrier spacing and a relationship between the third subcarrier spacing and the first subcarrier spacing, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the obtaining, by UE, a first subcarrier spacing notified by a base station includes: determining, by the UE based on signaling that is carried in a broadcast channel and that is sent by the base station, that the first subcarrier spacing is the parameter used for a data channel; or determining, by the UE based on signaling that is carried in a broadcast channel or system information and that is sent by the base station, that the first subcarrier spacing is the parameter used for a control channel or the parameter used for a random access channel; or determining, by the UE based on higher layer signaling sent by the base station, that the first subcarrier spacing is the parameter used for a control channel, a data channel, or a reference signal; or determining, by the UE based on signaling that is carried in a control channel and that is sent by the base station, that the first subcarrier spacing is the parameter used for a data channel and/or the parameter used for a reference signal.

Optionally, the obtaining, by UE, a first subcarrier spacing notified by a base station includes: determining, by the UE, the first subcarrier spacing based on at least one piece of the following information sent by the base station: a value of the first parameter, a relative relationship between the first parameter and a current parameter of the UE, a relative relationship between the first parameter and a common reference parameter, and a relative relationship between the first parameter and a parameter used for a preset channel.

Optionally, the method further includes: obtaining, by the UE, effective time of the first subcarrier spacing and/or an effective channel of the first subcarrier spacing that are/is notified by the base station.

According to a third aspect, an embodiment of this application further provides a signal transmission method, including: determining, by a base station, a synchronization signal frequency raster; determining, by the base station, a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal; and determining, by the base station, a synchronization signal frequency domain location based on the set of synchronization signal frequency domain locations, and sending a synchronization signal to user equipment.

Optionally, the determining, by a base station, a synchronization signal frequency raster includes: determining, by the base station, the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal, and the determining, by the base station, the synchronization signal frequency raster based on a synchronization signal subcarrier spacing includes: independently determining, by the base station, a frequency raster of each synchronization signal based on a subcarrier spacing of the synchronization signal; or determining, by the base station, frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the determining, by the base station, a set of synchronization signal frequency domain locations based on the synchronization signal frequency raster and a relationship between the synchronization signal frequency raster and a frequency domain location that can be used to send a synchronization signal includes: determining, by the base station, the set of synchronization signal frequency domain locations based on a synchronization signal bandwidth.

Optionally, the determining, by the base station, a set of synchronization signal frequency domain locations based on the synchronization signal frequency raster and a relationship between the synchronization signal frequency raster and a frequency domain location that can be used to send a synchronization signal includes: determining, by the base station, the set of synchronization signal frequency domain locations based on a center frequency, a highest frequency, or a lowest frequency of a transmission frequency band on which a synchronization signal is located.

Optionally, before the determining, by the base station, a synchronization signal frequency domain location based on the set of synchronization signal frequency domain locations, and sending a synchronization signal to user equipment, the method further includes: sending, by the base station, configuration information on another transmission frequency band, so that the user equipment determines a set of candidate synchronization signal locations or the synchronization signal frequency raster, where the configuration information is used to configure the set of synchronization signal frequency domain locations on an operation frequency band on which the synchronization signal is located; or sending, by the base station, configuration information to the user equipment by using another base station, so that the user equipment determines a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

According to a fourth aspect, this application further provides a signal transmission method, including: determining, by user equipment, a synchronization signal frequency raster; determining, by the user equipment, a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal; and detecting, by the user equipment, a synchronization signal based on the set of synchronization signal frequency domain locations.

Optionally, the determining, by user equipment, a synchronization signal frequency raster includes: determining, by the user equipment, the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal, and the determining, by the user equipment, the synchronization signal frequency raster based on a synchronization signal subcarrier spacing includes: independently determining, by the user equipment, a frequency raster of each synchronization signal based on a subcarrier spacing of the synchronization signal; or determining, by the user equipment, frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the determining, by the user equipment, a set of synchronization signal frequency domain locations based on the synchronization signal frequency raster and a relationship between the synchronization signal frequency raster and a frequency domain location that can be used to send a synchronization signal includes: determining, by the user equipment, the set of synchronization signal frequency domain locations based on a synchronization signal bandwidth.

Optionally, the determining, by the user equipment, a set of synchronization signal frequency domain locations based on the synchronization signal frequency raster and a relationship between the synchronization signal frequency raster and a frequency domain location that can be used to send a synchronization signal includes: determining, by the user equipment, the set of synchronization signal frequency domain locations based on a center frequency, a highest frequency, or a lowest frequency of a transmission frequency band on which a synchronization signal is located.

Optionally, before the detecting, by the user equipment, a synchronization signal based on the set of synchronization signal frequency domain locations, the method further includes: receiving, by the user equipment, configuration information on another transmission frequency band, to determine a set of candidate synchronization signal locations or the synchronization signal frequency raster, where the configuration information is used to configure the set of synchronization signal frequency domain locations on an operation frequency band on which the synchronization signal is located; or receiving, by the user equipment, configuration information from another base station, to determine a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

According to a fifth aspect, this application further provides a parameter determining apparatus, including: a determining module, configured to determine a first subcarrier spacing corresponding to user equipment UE; and a sending module, configured to notify the UE of the first subcarrier spacing.

Optionally, the apparatus further includes: a first receiving module, configured to receive a random access channel sent by the UE, where the random access channel is a channel sent by the UE by using a second subcarrier spacing; and the determining module is further configured to determine, based on the second subcarrier spacing, the first subcarrier spacing corresponding to the UE.

Optionally, the apparatus further includes: a second receiving module, configured to receive a request sent by the UE, where the request includes indication information corresponding to a subcarrier spacing requested by the UE; and the determining module is further configured to determine, based on the indication information corresponding to the subcarrier spacing requested by the UE, the first subcarrier spacing corresponding to the UE.

Optionally, the determining module is specifically configured to determine, based on a reference signal measurement value corresponding to at least one subcarrier spacing, the first subcarrier spacing corresponding to the UE.

Optionally, the determining module is further configured to determine, based on a reference signal measurement value corresponding to at least one cyclic prefix CP type, a CP type corresponding to the UE; and the sending module is further configured to notify the UE of the CP type corresponding to the UE.

Optionally, the apparatus further includes: a third receiving module, configured to receive at least one of the reference signal measurement value corresponding to the at least one subcarrier spacing, wherein the at least one of the reference signal measurement value is sent by the UE.

Optionally, the sending module is further configured to send, to the UE, a reference signal corresponding to the at least one subcarrier spacing.

Optionally, the apparatus further includes: a detection module, configured to detect a reference signal corresponding to each subcarrier spacing in the at least one subcarrier spacing, to obtain a reference signal measurement value corresponding to each subcarrier spacing.

Optionally, the apparatus further includes: a fourth receiving module, configured to receive the reference signal that is corresponding to each subcarrier spacing and that is sent by the UE.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the determining module is further configured to determine, based on a third subcarrier spacing and a relationship between the third subcarrier spacing and the first subcarrier spacing, the first subcarrier spacing corresponding to the UE, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the sending module is further configured to notify, by using signaling carried in a broadcast channel, the UE that the first subcarrier spacing is the subcarrier spacing used for a data channel; or the sending module is further configured to notify, by using signaling carried in a broadcast channel or system information, the UE that the first subcarrier spacing is the subcarrier spacing used for a control channel or the subcarrier spacing used for a random access channel; or the sending module is further configured to notify, by using higher layer signaling, the UE that the first subcarrier spacing is the subcarrier spacing used for a control channel, a data channel, or a reference signal; or the sending module is further configured to notify, by using signaling carried in a control channel, the UE that the first subcarrier spacing is the parameter used for a data channel and/or the subcarrier spacing used for a reference signal.

Optionally, the sending module is further configured to notify the UE of the first subcarrier spacing by sending at least one piece of the following information to the UE: a value of the first subcarrier spacing; a relative relationship between the first subcarrier spacing and a current subcarrier spacing of the UE; a relative relationship between the first subcarrier spacing and a common reference subcarrier spacing; and a relative relationship between the first subcarrier spacing and a subcarrier spacing used for a preset channel.

Optionally, the sending module is further configured to notify the UE of effective time of the first subcarrier spacing and/or an effective channel of the first subcarrier spacing.

According to a sixth aspect, an embodiment of this application further provides a parameter determining apparatus, including: a receiving module, configured to obtain a first subcarrier spacing notified by a base station; and a transmission module, configured to perform data transmission with the base station based on the first subcarrier spacing.

Optionally, the apparatus further includes: a first sending module, configured to send a random access channel to the base station by using a second subcarrier spacing, so that the base station determines the first subcarrier spacing based on the second subcarrier spacing.

Optionally, the apparatus further includes: a second sending module, configured to send a request to the base station, where the request includes indication information corresponding to a subcarrier spacing requested by the UE, and the request is used by the base station to determine the first subcarrier spacing based on the indication information corresponding to the subcarrier spacing requested by the UE.

Optionally, the first subcarrier spacing is a subcarrier spacing determined by the base station based on a reference signal measurement value corresponding to at least one subcarrier spacing.

Optionally, the receiving module is further configured to obtain a cyclic prefix CP type notified by the base station, where the CP type is a CP type determined by the base station based on a reference signal measurement value corresponding to at least one CP type.

Optionally, the apparatus further includes: a third sending module, configured to send, to the base station, at least one of the reference signal measurement value corresponding to the at least one subcarrier spacing.

Optionally, the receiving module is further configured to receive a reference signal that is corresponding to the at least one subcarrier spacing and that is sent by the base station.

Optionally, a reference signal measurement value corresponding to each subcarrier spacing in the at least one subcarrier spacing is obtained by detecting, by the base station, a reference signal corresponding to each subcarrier spacing.

Optionally, the apparatus further includes: a fourth sending module, configured to send, to the base station, a reference signal corresponding to the at least one subcarrier spacing.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the first subcarrier spacing is a subcarrier spacing determined by the base station based on a third subcarrier spacing and a relationship between the third subcarrier spacing and the first subcarrier spacing, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the receiving module is specifically configured to determine, based on signaling that is carried in a broadcast channel and that is sent by the base station, that the first subcarrier spacing is the parameter used for a data channel; or the receiving module is specifically configured to determine, based on signaling that is carried in a broadcast channel or system information and that is sent by the base station, that the first subcarrier spacing is the parameter used for a control channel or the parameter used for a random access channel; or the receiving module is specifically configured to determine, based on higher layer signaling sent by the base station, that the first subcarrier spacing is the parameter used for a control channel, a data channel, or a reference signal; or the receiving module is specifically configured to determine, based on signaling that is carried in a control channel and that is sent by the base station, that the first subcarrier spacing is the parameter used for a data channel and/or the parameter used for a reference signal.

Optionally, the receiving module is further configured to determine the first subcarrier spacing based on at least one piece of the following information sent by the base station: a value of the first parameter, a relative relationship between the first parameter and a current parameter of the UE, a relative relationship between the first parameter and a common reference parameter, and a relative relationship between the first parameter and a parameter used for a preset channel.

Optionally, the receiving module is further configured to obtain effective time of the first subcarrier spacing and/or an effective channel of the first subcarrier spacing that are/is notified by the base station.

According to a seventh aspect, an embodiment of this application further provides a signal transmission apparatus, including: a determining module, configured to: determine a synchronization signal frequency raster; determine a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal; and determine a synchronization signal frequency domain location based on the set of synchronization signal frequency domain locations; and a sending module, configured to send a synchronization signal to user equipment.

Optionally, the determining module is specifically configured to determine the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal, and the determining module is specifically configured to independently determine a frequency raster of each synchronization signal based on a subcarrier spacing of the synchronization signal; or the determining module is specifically configured to determine frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the determining module is specifically configured to determine the set of synchronization signal frequency domain locations based on a synchronization signal bandwidth.

Optionally, the determining module is specifically configured to determine the set of synchronization signal frequency domain locations based on a center frequency, a highest frequency, or a lowest frequency of a transmission frequency band on which a synchronization signal is located.

Optionally, the sending module is further configured to send configuration information on another transmission frequency band, so that the user equipment determines a set of candidate synchronization signal locations or the synchronization signal frequency raster, where the configuration information is used to configure the set of synchronization signal frequency domain locations on an operation frequency band on which the synchronization signal is located; or the sending module is further configured to send configuration information to the user equipment by using another base station, so that the user equipment determines a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

According to an eighth aspect, this application further provides a signal transmission apparatus, including: a determining module, configured to: determine a synchronization signal frequency raster, and determine a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal; and a receiving module, configured to detect a synchronization signal based on the set of synchronization signal frequency domain locations.

Optionally, the determining module is specifically configured to determine the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal, and the determining module is specifically configured to independently determine a frequency raster of each synchronization signal based on a subcarrier spacing of the synchronization signal; or the determining module is specifically configured to determine frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the determining module is specifically configured to determine the set of synchronization signal frequency domain locations based on a synchronization signal bandwidth.

Optionally, the determining module is specifically configured to determine the set of synchronization signal frequency domain locations based on a center frequency, a highest frequency, or a lowest frequency of a transmission frequency band on which a synchronization signal is located.

Optionally, the receiving module is further configured to receive configuration information on another transmission frequency band, to determine a set of candidate synchronization signal locations or the synchronization signal frequency raster, where the configuration information is used to configure the set of synchronization signal frequency domain locations on an operation frequency band on which the synchronization signal is located; or the receiving module is further configured to receive configuration information from another base station, to determine a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

According to a ninth aspect, an embodiment of this application further provides a base station, including a processor and a transmitter, where the processor is connected to the transmitter; the processor is configured to determine a first subcarrier spacing corresponding to user equipment UE; and the transmitter is configured to notify the UE of the first subcarrier spacing.

Optionally, the base station further includes: a receiver, configured to receive a random access channel sent by the UE, where the random access channel is a channel sent by the UE by using a second subcarrier spacing; and the processor is further configured to determine, based on the second subcarrier spacing, the first subcarrier spacing corresponding to the UE.

Optionally, the base station further includes: a receiver, configured to receive a request sent by the UE, where the request includes indication information corresponding to a subcarrier spacing requested by the UE; and the processor is further configured to determine, based on the indication information corresponding to the subcarrier spacing requested by the UE, the first subcarrier spacing corresponding to the UE.

Optionally, the processor is further configured to determine, based on a reference signal measurement value corresponding to at least one subcarrier spacing, the first subcarrier spacing corresponding to the UE.

Optionally, the processor is further configured to determine, based on a reference signal measurement value corresponding to at least one cyclic prefix CP type, a CP type corresponding to the UE; and the transmitter is further configured to notify the UE of the CP type corresponding to the UE.

Optionally, the base station further includes: a receiver, configured to receive at least one of the reference signal measurement value corresponding to the at least one subcarrier spacing, wherein the at least one of the reference signal measurement value is sent by the UE.

Optionally, the transmitter is further configured to send, to the UE, a reference signal corresponding to the at least one subcarrier spacing.

Optionally, the processor is further configured to detect a reference signal corresponding to each subcarrier spacing in the at least one subcarrier spacing, to obtain a reference signal measurement value corresponding to each subcarrier spacing.

Optionally, the base station further includes: a receiver, configured to receive the reference signal that is corresponding to each subcarrier spacing and that is sent by the UE.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the processor is specifically configured to determine, based on a third subcarrier spacing and a relationship between the third subcarrier spacing and the first subcarrier spacing, the first subcarrier spacing corresponding to the UE, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the transmitter is specifically configured to notify, by using signaling carried in a broadcast channel, the UE that the first subcarrier spacing is the subcarrier spacing used for a data channel; or the transmitter is specifically configured to notify, by using signaling carried in a broadcast channel or system information, the UE that the first subcarrier spacing is the subcarrier spacing used for a control channel or the subcarrier spacing used for a random access channel; or the transmitter is specifically configured to notify, by using higher layer signaling, the UE that the first subcarrier spacing is the subcarrier spacing used for a control channel, a data channel, or a reference signal; or the transmitter is specifically configured to notify, by using signaling carried in a control channel, the UE that the first subcarrier spacing is the parameter used for a data channel and/or the subcarrier spacing used for a reference signal.

Optionally, the transmitter is specifically configured to notify the UE of the first subcarrier spacing by sending at least one piece of the following information to the UE: a value of the first subcarrier spacing; a relative relationship between the first subcarrier spacing and a current subcarrier spacing of the UE; a relative relationship between the first subcarrier spacing and a common reference subcarrier spacing; and a relative relationship between the first subcarrier spacing and a subcarrier spacing used for a preset channel.

Optionally, the transmitter is further configured to notify the UE of effective time of the first subcarrier spacing and/or an effective channel of the first subcarrier spacing.

According to a tenth aspect, an embodiment of this application further provides UE, including a receiver and a processor, where the receiver is connected to the processor; the receiver is configured to obtain a first subcarrier spacing notified by a base station; and the processor is configured to perform data transmission with the base station based on the first subcarrier spacing.

Optionally, the UE further includes: a transmitter, configured to send a random access channel to the base station by using a second subcarrier spacing, so that the base station determines the first subcarrier spacing based on the second subcarrier spacing.

Optionally, the UE further includes: a transmitter, configured to send a request to the base station, where the request includes indication information corresponding to a subcarrier spacing requested by the UE, and the request is used by the base station to determine the first subcarrier spacing based on the indication information corresponding to the subcarrier spacing requested by the UE.

Optionally, the first subcarrier spacing is a subcarrier spacing determined by the base station based on a reference signal measurement value corresponding to at least one subcarrier spacing.

Optionally, the receiver is further configured to obtain a cyclic prefix CP type notified by the base station, where the CP type is a CP type determined by the base station based on a reference signal measurement value corresponding to at least one CP type.

Optionally, the UE further includes: a transmitter, configured to send, to the base station, at least one of the reference signal measurement value corresponding to the at least one subcarrier spacing.

Optionally, the receiver is further configured to receive a reference signal that is corresponding to the at least one subcarrier spacing and that is sent by the base station.

Optionally, a reference signal measurement value corresponding to each subcarrier spacing in the at least one subcarrier spacing is obtained by detecting, by the base station, a reference signal corresponding to each subcarrier spacing.

Optionally, the UE further includes: a transmitter, configured to send, to the base station, a reference signal corresponding to the at least one subcarrier spacing.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the first subcarrier spacing is a subcarrier spacing determined by the base station based on a third subcarrier spacing and a relationship between the third subcarrier spacing and the first subcarrier spacing, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the processor is further configured to determine, based on signaling that is carried in a broadcast channel and that is sent by the base station, that the first subcarrier spacing is the parameter used for a data channel; or the processor is further configured to determine, based on signaling that is carried in a broadcast channel or system information and that is sent by the base station, that the first subcarrier spacing is the parameter used for a control channel or the parameter used for a random access channel; or the processor is further configured to determine, based on higher layer signaling sent by the base station, that the first subcarrier spacing is the parameter used for a control channel, a data channel, or a reference signal; or the processor is further configured to determine, based on signaling that is carried in a control channel and that is sent by the base station, that the first subcarrier spacing is the parameter used for a data channel and/or the parameter used for a reference signal.

Optionally, the processor is further configured to determine the first subcarrier spacing based on at least one piece of the following information sent by the base station: a value of the first parameter, a relative relationship between the first parameter and a current parameter of the UE, a relative relationship between the first parameter and a common reference parameter, and a relative relationship between the first parameter and a parameter used for a preset channel.

Optionally, the receiver is further configured to obtain effective time of the first subcarrier spacing and/or an effective channel of the first subcarrier spacing that are/is notified by the base station.

According to an eleventh aspect, an embodiment of this application further provides a base station, including a processor and a transmitter, where the processor is connected to the transmitter; the processor is configured to: determine a synchronization signal frequency raster; determine a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal; and determine a synchronization signal frequency domain location based on the set of synchronization signal frequency domain locations; and the transmitter is configured to send a synchronization signal to user equipment at the synchronization signal frequency domain location.

Optionally, the processor is specifically configured to determine the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal; and the processor is specifically configured to independently determine a frequency raster of each synchronization signal based on a subcarrier spacing of the synchronization signal; or the processor is specifically configured to determine frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the processor is specifically configured to determine the set of synchronization signal frequency domain locations based on a synchronization signal bandwidth.

Optionally, the processor is specifically configured to determine the set of synchronization signal frequency domain locations based on a center frequency, a highest frequency, or a lowest frequency of a transmission frequency band on which a synchronization signal is located.

Optionally, the base station further includes: a receiver, configured to send configuration information on another transmission frequency band, so that the user equipment determines a set of candidate synchronization signal locations or the synchronization signal frequency raster, where the configuration information is used to configure the set of synchronization signal frequency domain locations on an operation frequency band on which the synchronization signal is located; or a receiver, configured to send configuration information to the user equipment by using another base station, so that the user equipment determines a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

According to a twelfth aspect, this application further provides user equipment, including a processor and a receiver, where the processor is connected to the receiver; the processor is configured to: determine a synchronization signal frequency raster, and determine a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal; and the receiver is configured to detect a synchronization signal based on the set of synchronization signal frequency domain locations.

Optionally, the processor is specifically configured to determine the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal, and the processor is specifically configured to independently determine a frequency raster of each synchronization signal based on a subcarrier spacing of the synchronization signal; or the processor is specifically configured to determine frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the processor is specifically configured to determine the set of synchronization signal frequency domain locations based on a synchronization signal bandwidth.

Optionally, the processor is specifically configured to determine the set of synchronization signal frequency domain locations based on a center frequency, a highest frequency, or a lowest frequency of a transmission frequency band on which a synchronization signal is located.

Optionally, the receiver is further configured to receive configuration information on another transmission frequency band, to determine a set of candidate synchronization signal locations or the synchronization signal frequency raster, where the configuration information is used to configure the set of synchronization signal frequency domain locations on an operation frequency band on which the synchronization signal is located; or the receiver is configured to receive configuration information from another base station, to determine a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

According to the parameter determining method, the base station, and the user equipment in the embodiments of this application, the base station determines the first subcarrier spacing corresponding to the UE, and notifies the UE of the first subcarrier spacing, so that after obtaining the first subcarrier spacing, the UE can perform data transmission with the base station based on the first subcarrier spacing. In the method, the UE may accurately learn of, in a multi-subcarrier-spacing system, a subcarrier spacing used for data transmission, and then perform data transmission. This can effectively ensure that the UE performs a corresponding service, thereby meeting a corresponding service requirement.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
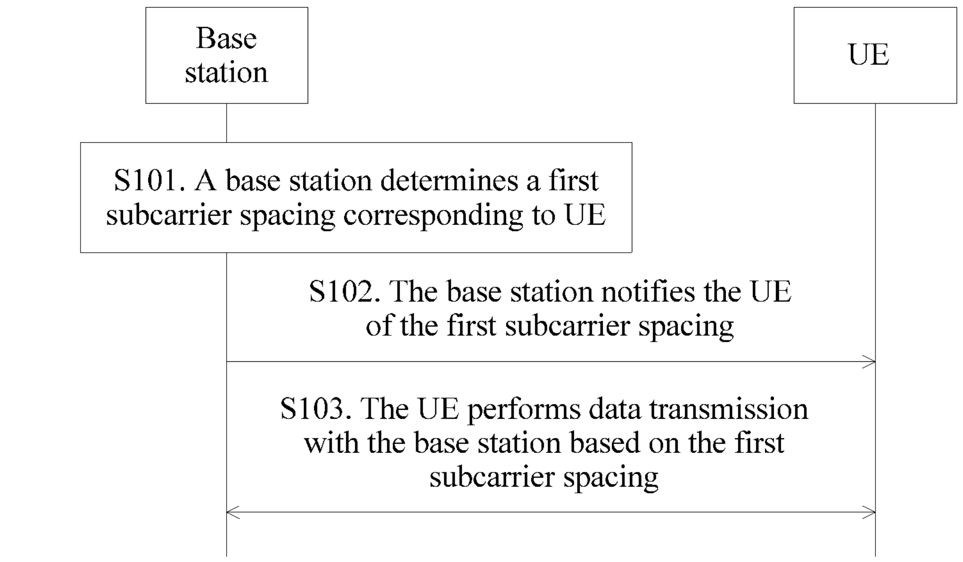
FIG. 1 is a flowchart of a parameter determining method according to Embodiment 1 of this application.

A method in embodiments of this application is applicable to a wireless communications system, and the communications system includes a base station and a terminal. The base station (for example, an access point or a transmission reception point) may be a device that is in an access network and that communicates, over an air interface, with a wireless terminal by using one or more sectors. The base station may further coordinate attribute management of the air interface, for example, the base station may be an evolved NodeB (eNB or e-NodeB) in Long Term Evolution (LTE). It should be noted that, the base station in the embodiments of this application may be a base station, or may be a relay device, or may be another network element device that has a base station function. No limitation is imposed in this application. The terminal may be a wireless terminal or a wired terminal. The wireless terminal may be a device that provides voice and/or data connectivity for a user, a handheld device with a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) or a computer with a mobile terminal. For example, the wireless terminal may be a portable, pocket-sized, handheld, computer built-in, or in-vehicle mobile apparatus that exchanges voice and/or data with the radio access network, for example, a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MB), a mobile console (Mobile), a remote station (RS), an access point (AP), a remote terminal (RT), an access terminal (AT), a user terminal (UT), a user agent (UA), a user device (UD), or user equipment (UE).

It may be understood that, "at least two" in the embodiments of this application means "two" or "more than two".

In an existing Long Term Evolution (LTE) communications system, for different types of services, an uplink service and a downlink service that are of a same type of service, and different channels of a same type of service, data transmission is mainly performed by using a fixed subcarrier spacing such as 15 kHz. In other words, in the current LTE system, a subcarrier spacing that needs to be used by UE is actually preconfigured on the UE side.

However, to meet different types of service requirements, different channel transmission requirements, and the like in a 5G technology, a plurality of subcarrier spacings are required in a 5G communications system, to be separately corresponding to different service types and/or different channels, and the like. When there are a plurality of subcarrier spacings in the communications system, because a subcarrier spacing required in current data transmission of the UE is uncertain, to meet a current data transmission requirement of the UE, the subcarrier spacing required in current data transmission needs to be determined for the UE.

A parameter determining method and apparatus, a base station, and user equipment in the following embodiments of this application are intended to: when there are a plurality of parameters such as a plurality of subcarrier spacings in the communications system, accurately determine, for the UE, a subcarrier spacing currently required by the UE, so that the UE can accurately implement a corresponding service.

The following uses specific embodiments to describe in detail the technical solutions in this application and how the foregoing technical problem is resolved in the technical solutions in this application. The following specific embodiments may be mutually combined, and same or similar concepts or processes may not be repeatedly described in some embodiments.

It should be noted that, a reference signal mentioned in this application may also be referred to as a reference channel, a pilot channel, or a pilot signal, and a synchronization signal may also be referred to as a synchronization channel.

FIG. 1 is a flowchart of a parameter determining method according to Embodiment 1 of this application. The parameter determining method may be executed through interaction between a base station and UE. As shown in FIG. 1, the parameter determining method in this embodiment may include the following steps.

S101. The base station determines a first subcarrier spacing corresponding to the UE.

Specifically, the base station may determine, according to a preset subcarrier spacing determining rule, the first subcarrier spacing corresponding to the UE; or may determine, based on a subcarrier spacing currently used by the UE, the first subcarrier spacing corresponding to the UE; or may determine, based on indication information of a subcarrier spacing requested by the UE, the first subcarrier spacing corresponding to the UE; or may determine, by measuring a reference signal corresponding to at least one subcarrier spacing, the first subcarrier spacing corresponding to the UE; or may determine, based on another known subcarrier spacing, the first subcarrier spacing corresponding to the UE. It should be noted that, the base station in the method may further determine, in another manner, the first subcarrier spacing corresponding to the UE.

The first subcarrier spacing may be a reference subcarrier spacing, and the reference subcarrier spacing may include a common-level reference subcarrier spacing and/or a UE-level reference subcarrier spacing.

Alternatively, the first subcarrier spacing may be a subcarrier spacing used for a channel, and the subcarrier spacing used for a channel may include a subcarrier spacing used for a common channel and/or a subcarrier spacing used for a UE-level channel.

S102. The base station notifies the UE of the first subcarrier spacing.

The base station may notify the UE of the first subcarrier spacing by using signaling, or may notify the UE of the first subcarrier spacing in another manner. The base station may notify the UE of a specific parameter value of the first subcarrier spacing, or may notify the UE of a correspondence between the first subcarrier spacing and another parameter. In other words, the base station may explicitly notify the UE of the first subcarrier spacing, or may implicitly notify the UE of the first subcarrier spacing. Certainly, the base station may notify the UE of the first subcarrier spacing in another manner. No limitation is imposed in this application.

The base station may add a value or indication information of the first subcarrier into information bits of signaling and send the signaling to the UE, to notify the UE of the first subcarrier spacing.

The signaling may be, for example, at least one of the following: a random access response; a message 4 in a random access procedure; radio resource control (RRC) signaling; a media access control control element (MAC CE); and a physical downlink control channel.

S103. The UE performs data transmission with the base station based on the first subcarrier spacing.

Specifically, in a transmission process of data, the base station generates a baseband signal of the data based on the first subcarrier spacing.

Alternatively, the UE may determine, based on the first subcarrier spacing, a subframe length corresponding to the first subcarrier spacing; determine a time unit of data transmission based on the subframe length; and perform data transmission with the base station based on the time unit. The time unit may be referred to as a transmission time interval, and the transmission time interval may be a length of at least one subframe, slot, and mini slot. One subframe includes several slots or mini slots.

For example, the first subcarrier spacing may be, 15 kHz*2^n, where n is any integer from −2 to 6. For example, the UE may determine an n value of the first subcarrier spacing based on the first subcarrier spacing, and then determine, by using an expression 1/(2^n) ms based on the n value, the subframe length corresponding to the first subcarrier spacing.

Optionally, for example, S103 that the UE performs data transmission with the base station based on the first subcarrier spacing may include the following:

The UE sends a channel to the base station based on the first subcarrier spacing, and the base station receives, based on the first subcarrier spacing, the channel sent by the UE; or the base station sends a channel to the UE based on the first subcarrier spacing, and the UE receives based on the first subcarrier spacing, the channel sent by the base station.

In the parameter determining method provided in Embodiment 1 of this application, the base station determines the first subcarrier spacing corresponding to the UE, and notifies the UE of the first subcarrier spacing, so that after obtaining the first subcarrier spacing, the UE can perform data transmission with the base station based on the first subcarrier spacing. In the method, the UE may accurately learn of, in a multi-subcarrier-spacing system, a subcarrier spacing used for data transmission, and then perform data transmission. This can effectively ensure that the UE performs a corresponding service, thereby meeting a corresponding service requirement.

Optionally, S101 that the base station determines a first subcarrier spacing corresponding to the UE may include the following:

The base station determines, based on a carrier frequency on which the UE operates, a subcarrier spacing corresponding to the carrier frequency as the first subcarrier spacing corresponding to the UE.

Specifically, for example, the base station may determine, based on the carrier frequency and a preset correspondence between a carrier frequency and a subcarrier spacing, the subcarrier spacing corresponding to the carrier frequency as the first subcarrier spacing corresponding to the UE. The preset correspondence between a carrier frequency and a subcarrier spacing may be stored on the base station side in a form of a table or a database.

For example, the preset correspondence between a carrier frequency and a subcarrier spacing may be shown in the following Table 1.

TABLE 1

| Carrier frequency | Subcarrier spacing |
|---|---|
| Below 6 GHz | 15 kHz, 30 kHz, or 60 kHz |
| 30 GHz | 60 kHz, 120 kHz, or 240 kHz |

Referring to Table 1, if the carrier frequency is below 6 GHz, in the method, the base station may determine, based on the carrier frequency, that the first subcarrier spacing is 15 kHz, 30 kHz, or 60 kHz. If the carrier frequency is 30 GHz, in the method, the base station may determine, based on the carrier frequency, that the first subcarrier spacing is 60 kHz, 120 kHz, or 240 kHz.

Optionally, in the method, the base station may further determine, based on the carrier frequency, a cyclic prefix (CP) type corresponding to the carrier frequency as a CP type corresponding to the UE.

Specifically, for example, the base station may determine, based on the carrier frequency and a preset correspondence between a carrier frequency and a CP type, the CP type corresponding to the carrier frequency as the CP type corresponding to the UE. The preset correspondence between a carrier frequency and a CP type may be stored on a base station side in a form of a table or a database.

For example, the preset correspondence between a carrier frequency and a CP type may be shown in the following Table 2.

TABLE 2

| Carrier frequency | CP type |
|---|---|
| Below 6 GHz | NCP |
| 30 GHz | NCP or ECP |

Referring to Table 2, if the carrier frequency is below 6 GHz, in the method, the base station may determine, based on the carrier frequency, that the CP type corresponding to the UE is a normal cyclic prefix (NCP). If the carrier frequency is 30 GHz, in the method, the base station may determine, based on the carrier frequency, that the CP type corresponding to the UE is an NCP or an extended cyclic prefix (ECP).

Alternatively, S101 that the base station determines a first subcarrier spacing corresponding to the UE may include the following:

The base station determines, based on a type of the UE, a subcarrier spacing corresponding to the type of the UE as the first subcarrier spacing corresponding to the UE.

Specifically, the base station may define different UE types based on a service type supported by a user. For example, the base station may determine, based on the type of the UE and a preset correspondence between a UE type and a subcarrier spacing, the subcarrier spacing corresponding to the type of the UE as the first subcarrier spacing corresponding to the UE. The preset correspondence between a UE type and a subcarrier spacing may be stored on the base station side in a form of a table or a database.

For example, the preset correspondence between a UE type and a subcarrier spacing may be shown in the following Table 3.

TABLE 3

| UE type | Supported service type | Subcarrier spacing |
|---|---|---|
| Type 1 | eMBB service | 7.5 kHz, 15 kHz, 30 kHz, or 60 kHz |
| Type 2 | URLLC service | 15 kHz, 30 kHz, or 60 kHz |
| Type 3 | mMTC service | 3.75 kHz, 7.5 kHz, or 15 kHz |
| Type 4 | eMBB service and URLLC service | 7.5 kHz, 15 kHz, 30 kHz, or 60 kHz |

Referring to Table 3, if the type of the UE is the type 1 and the UE may support the eMBB service, in the method, the base station may determine, based on the type of the UE, that the first subcarrier spacing corresponding to the UE is any one of 7.5 kHz, 15 kHz, 30 kHz, or 60 kHz. If the type of the UE is the type 2 and the UE may support the URLLC service, in the method, the base station may determine, based on the type of the UE, that the first subcarrier spacing corresponding to the UE is any one of 15 kHz, 30 kHz, or 60 kHz. If the type of the UE is the type 3 and the UE may support the mMTC service, in the method, the base station may determine, based on the type of the UE, that the first subcarrier spacing corresponding to the UE is any one of 3.75 kHz, 7.5 kHz, or 15 kHz. If the type of the UE is the type 4 and the UE may support the eMBB service and the URLLC service, in the method, the base station may determine, based on the type of the UE, that the first subcarrier spacing corresponding to the UE is any one of 7.5 kHz, 15 kHz, 30 kHz, or 60 kHz.

Optionally, the base station may define different UE types based on a carrier frequency on which a user operates. For example, the base station may determine, based on the type of the UE and a preset correspondence between a UE type and a subcarrier spacing, the subcarrier spacing corresponding to the type of the UE as the first subcarrier spacing corresponding to the UE. The preset correspondence between a UE type and a subcarrier spacing may be stored on the base station side in a form of a table or a database.

TABLE 4

| UE type | Operating carrier frequency | Subcarrier spacing |
|---|---|---|
| Type 1 | Below 6 GHz | 15 kHz, 30 kHz, or 60 kHz |
| Type 2 | Approximately 30 GHz | 60 kHz, 120 kHz, or 240 kHz |
| Type 3 | Approximately 70 GHz | 240 kHz or 480 kHz |

Referring to Table 4, if the type of the UE is the type 1 and the carrier frequency on which the UE operates is below 6 GHz, the base station determines that the first subcarrier spacing corresponding to the UE is 15 kHz, 30 kHz, or 60 kHz. If the type of the UE is the type 2 and the carrier frequency on which the UE operates is approximately 30 GHz, the base station determines that the first subcarrier spacing corresponding to the UE is 60 kHz, 120 kHz, or 240 kHz. If the type of the UE is the type 3 and the carrier frequency on which the UE operates is approximately 70 GHz, the base station determines that the first subcarrier spacing corresponding to the UE is 240 kHz or 480 kHz.

Optionally, in the method, the base station may further determine, based on the type of the UE, a CP type corresponding to the type of the UE as a CP type corresponding to the UE.

Specifically, for example, the base station may determine, based on the type of the UE and a preset correspondence between a UE type and a CP type, the CP type corresponding to the type of the UE as the CP type corresponding to the UE.

The preset correspondence between a UE type and a CP type may be stored on the base station side in a form of a table or a database.

For example, the preset correspondence between a UE type and a CP type may be shown in the following Table 5.

TABLE 5

| UE type | CP type |
|---|---|
| Type 1 | NCP or ECP |
| Type 2 | NCP or ECP |
| Type 3 | NCP or ECP |
| Type 4 | NCP or ECP |

Referring to Table 5, regardless of whether the type of the UE is the type 1, the type 2, the type 3, or the type 4, the CP type corresponding to the UE may be an NCP or an ECP.

Alternatively, S101 that the base station determines a first subcarrier spacing corresponding to the UE may include the following:

The base station determines, based on a channel type, a subcarrier spacing corresponding to the channel type as the first subcarrier spacing corresponding to the UE.

Specifically, the base station may determine, based on the channel type, a subcarrier spacing corresponding to a preset channel type, and a relative relationship between the channel type and the subcarrier spacing corresponding to the preset channel type, the first subcarrier spacing corresponding to the UE.

For example, if the channel type is a control channel, and the preset channel type may be, for example, a data channel, the relative relationship between the channel type and the subcarrier spacing corresponding to the preset channel type may include the following: A subcarrier spacing corresponding to the control channel is the same as the subcarrier spacing corresponding to the preset channel type, or a subcarrier spacing corresponding to the control channel is an integer multiple such as 2^n times of the subcarrier spacing corresponding to the preset channel type, where n is any integer from −2 to 6.

If the channel type is a reference signal, and the preset channel type may be, for example, a data channel, the relative relationship between the channel type and the subcarrier spacing corresponding to the preset channel type may include the following: A subcarrier spacing corresponding to the reference signal is the same as the subcarrier spacing corresponding to the preset channel type, or a subcarrier spacing corresponding to the reference signal is an integer multiple such as 2^n times of the subcarrier spacing corresponding to the preset channel type, where n is any integer from −2 to 6.

Optionally, the method may further include the following:

The base station determines, based on a channel transmission mode, a CP type corresponding to the channel transmission mode as a CP type corresponding to the UE.

Specifically, if the channel transmission mode is a single-station transmission mode, the base station may determine, based on the transmission mode, that the CP type corresponding to the UE is an NCP; or if the channel transmission mode is a multi-station transmission mode, the base station may determine, based on the transmission mode, that the CP type corresponding to the UE is an ECP. The multi-station transmission mode may include a transmission mode in which a plurality of stations transmit same data.

It should be noted that, the foregoing solution of determining, based on any one of the carrier frequency, the type of the UE, or the channel type, the first subcarrier spacing corresponding to the UE may also be executed by the UE. For example, if the UE determines, based on any one of the carrier frequency, the type of the UE, or the channel type, the first subcarrier spacing corresponding to the UE, the base station does not need to notify the UE of the first subcarrier spacing. In other words, the base station and the UE may use a same subcarrier spacing determining rule to determine the first subcarrier spacing corresponding to the UE. In this way, the UE may also accurately learn of, in a multi-subcarrier-spacing system, a subcarrier spacing used for data transmission, and then perform data transmission. This can effectively ensure that the UE performs a corresponding service, thereby meeting a corresponding service requirement. The foregoing subcarrier spacing determining rule may be as follows: Determining is performed based on any one of the carrier frequency, the type of the UE, or the channel type.

Figure 2:
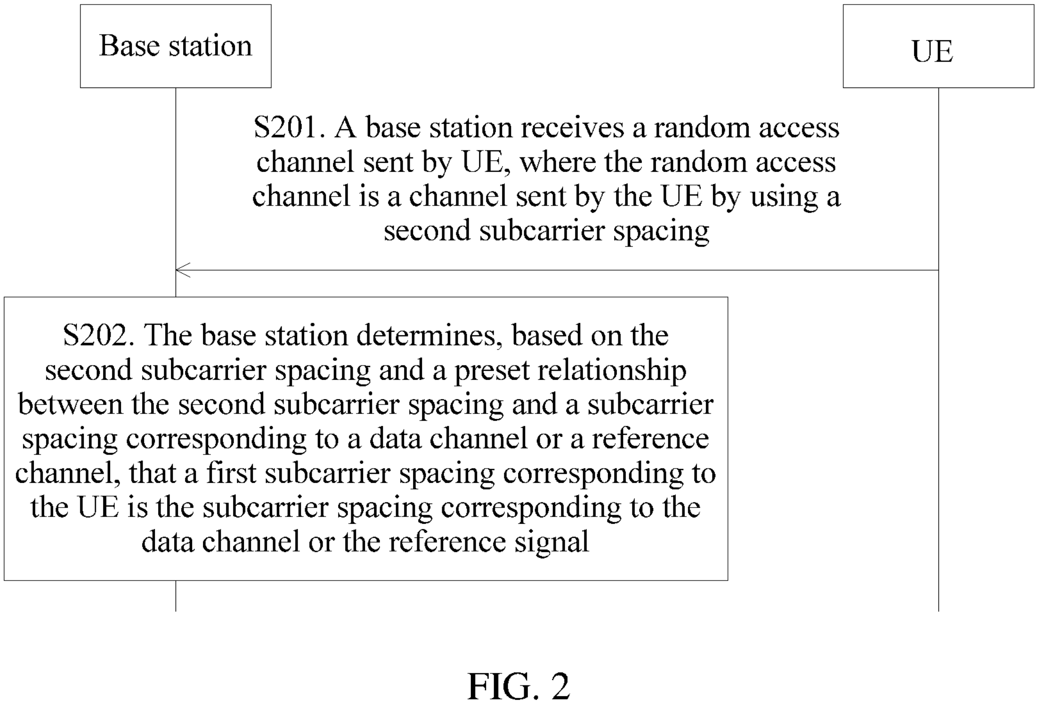
FIG. 2 is a flowchart of a parameter determining method according to Embodiment 2 of this application.

Optionally, Embodiment 2 of this application may further provide a parameter determining method. FIG. 2 is a flowchart of a parameter determining method according to Embodiment 2 of this application. As shown in FIG. 2, the method is based on the foregoing parameter determining method. Before S101 that the base station determines a first subcarrier spacing corresponding to the UE, the method may further include the following steps:

S201. The base station receives a random access channel sent by the UE, where the random access channel is a channel sent by the UE by using a second subcarrier spacing.

S202. The base station determines, based on the second subcarrier spacing and a preset relationship between the second subcarrier spacing and a subcarrier spacing corresponding to a data channel or a reference channel, that the first subcarrier spacing corresponding to the UE is the subcarrier spacing corresponding to the data channel or the reference signal.

Specifically, the subcarrier spacing corresponding to the data channel/reference signal is the same as the second subcarrier spacing, or the subcarrier spacing corresponding to the data channel/reference signal is an integer multiple such as 2^n times of the second subcarrier spacing.

Figure 3:
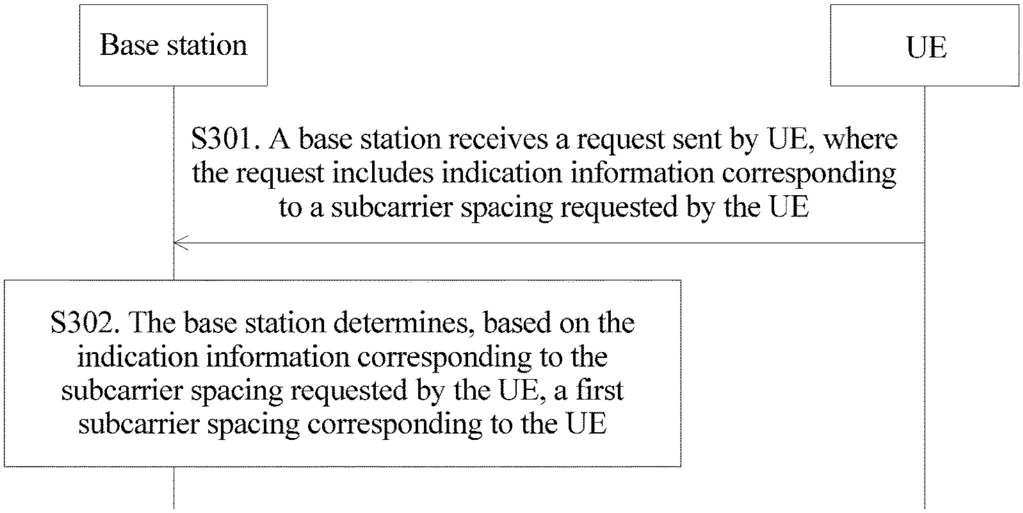
FIG. 3 is a flowchart of another parameter determining method according to Embodiment 2 of this application.

Alternatively, Embodiment 2 of this application may further provide a parameter determining method. FIG. 3 is a flowchart of another parameter determining method according to Embodiment 2 of this application. As shown in FIG. 3, the method is based on the foregoing parameter determining method. Before S101 that the base station determines a first subcarrier spacing corresponding to the UE, the method may further include the following steps.

S301. The base station receives a request sent by the UE, where the request includes indication information corresponding to a subcarrier spacing requested by the UE.

Specifically, for example, the UE may send the request to the base station when the UE determines that subcarrier spacing switching needs to be performed, and the subcarrier spacing that is requested by the UE and is included in the request is a target subcarrier spacing to which the UE requests to switch.

For example, the indication information corresponding to the subcarrier spacing requested by the UE may be represented by a specific parameter value of the subcarrier spacing requested by the UE, or may be represented by a relative relationship between the subcarrier spacing requested by the UE and a preset subcarrier spacing. For example, the preset subcarrier spacing is any one of a current reference subcarrier spacing of the UE, a common reference subcarrier spacing, or a subcarrier spacing used for at least one channel. The relative relationship between the subcarrier spacing requested by the UE and the preset subcarrier spacing may include the following: The subcarrier spacing requested by the UE is the same as the preset subcarrier spacing, or the subcarrier spacing requested by the UE is an integer multiple such as 2^n times of the preset subcarrier spacing, where n is any integer from −2 to 6.

For example, if the indication information corresponding to the subcarrier spacing requested by the UE is represented by the specific parameter value of the subcarrier spacing requested by the UE, the indication information corresponding to the subcarrier spacing requested by the UE may be, for example, any one of 3.75 kHz, 7.5 kHz, 15 kHz, 30 kHz, 60 kHz, or the like, or 15 kHz*2^n, or 15 kHz*m or 15 kHz/m, where n is any integer from −2 to 6, and m is an integer greater than 0. If the indication information corresponding to the subcarrier spacing requested by the UE is represented by the relative relationship between the subcarrier spacing requested by the UE and the preset subcarrier spacing, the indication information corresponding to the subcarrier spacing requested by the UE may be n, where n is any integer from −2 to 6.

S302. The base station determines, based on the indication information corresponding to the subcarrier spacing requested by the UE, the first subcarrier spacing corresponding to the UE.

Specifically, the base station may determine, based on the indication information corresponding to the subcarrier spacing requested by the UE, the subcarrier spacing requested by the UE, and determine whether the subcarrier spacing requested by the UE is applicable to the UE. If the subcarrier spacing requested by the UE is applicable to the UE, the base station determines the subcarrier spacing requested by the UE as the first subcarrier spacing corresponding to the UE. If the subcarrier spacing requested by the UE is not applicable to the UE, the base station determines, based on the subcarrier spacing requested by the UE, a subcarrier spacing as the first subcarrier spacing corresponding to the UE, where a preset difference exists between the subcarrier spacing and the subcarrier spacing requested by the UE.

The base station determines, based on the indication information corresponding to the subcarrier spacing requested by the UE, the first subcarrier spacing corresponding to the UE, so that the UE accurately performs subcarrier spacing switching after learning of the first subcarrier spacing, to accurately implement a corresponding service requirement, and ensure service performance.

Figure 4:
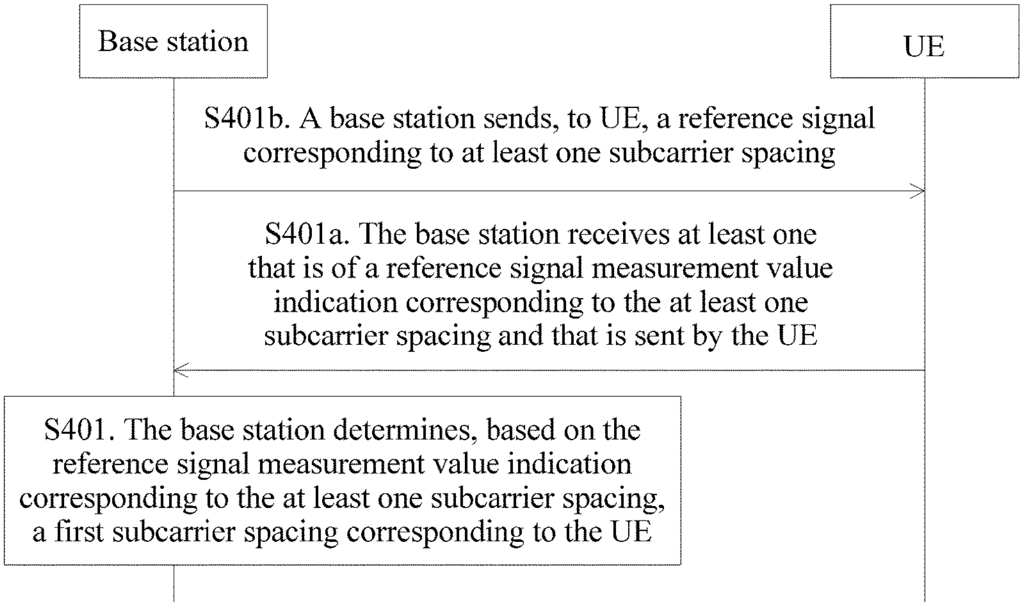
FIG. 4 is a flowchart of another parameter determining method according to Embodiment 2 of this application.

Alternatively, Embodiment 2 of this application may further provide a parameter determining method. FIG. 4 is a flowchart of another parameter determining method according to Embodiment 2 of this application. As shown in FIG. 4, the method is based on the foregoing parameter determining method. S101 that the base station determines a first subcarrier spacing corresponding to the UE includes the following step:

S401. The base station determines, based on a reference signal measurement value indication corresponding to at least one subcarrier spacing, the first subcarrier spacing corresponding to the UE.

Specifically, the base station may select, based on the reference signal measurement value indication corresponding to the at least one subcarrier spacing, one subcarrier spacing from the at least one subcarrier spacing as the first subcarrier spacing corresponding to the UE. The reference signal measurement value indication in this application may also be referred to as a subcarrier quality indication.

The reference signal measurement value indication may include at least one of the following measurement value indications: a signal to interference plus noise ratio (SINR), a reference signal received power (RSRP), and the like of a reference signal corresponding to each subcarrier spacing. A reference signal measurement value indication corresponding to each subcarrier spacing may be a filtered measurement value indication. Alternatively, the measurement value indication indicates a subcarrier spacing corresponding to a maximum measurement value.

The reference signal corresponding to each subcarrier spacing is a reference signal sent by using the subcarrier spacing. The reference signal may include at least one of a subcarrier spacing reference signal (RS), a channel state information-reference signal (CSI-RS), a demodulation reference signal (DMRS), a synchronization reference signal, and the like. The subcarrier spacing reference signal may also have another name, and mainly means a function of switching to/obtaining a target subcarrier spacing/CP through measurement of a reference signal sent by using a plurality of subcarrier spacings/CPs.

The reference signal corresponding to each subcarrier spacing is a reference signal sent by using the subcarrier spacing. The reference signal may include at least one of a multi-parameter selection reference signal (RS), a channel state information-reference signal (CSI-RS), a demodulation reference signal (DMRS), a synchronization reference signal, and the like.

Optionally, the method may further include the following:

The base station determines, based on a reference signal measurement value corresponding to at least one CP type, a CP type corresponding to the UE; and the base station notifies the UE of the CP type corresponding to the UE.

Specifically, the base station may select, based on the reference signal measurement value corresponding to the at least one CP type, a CP type from the at least one CP type as the CP type corresponding to the UE. A reference signal corresponding to each CP type is a reference signal sent by using the CP type.

The base station may notify the UE of the CP type corresponding to the UE in a manner that is the same as or similar to the foregoing manner of notifying the UE of the first subcarrier spacing, and details are not described herein.

Optionally, before S401 that the base station determines, based on a reference signal measurement value corresponding to at least one subcarrier spacing, the first subcarrier spacing corresponding to the UE, the method may further include the following:

**S401*a***. The base station receives at least one that is of the reference signal measurement value indication corresponding to the at least one subcarrier spacing and that is sent by the UE.

In other words, the reference signal measurement value corresponding to the at least one subcarrier spacing may be at least one of a value that is sent by the UE and is obtained after the UE measures a reference signal corresponding to the at least one subcarrier spacing. For example, the UE sends only a measurement value indication indicating best quality, and the measurement value indication may be a measurement value, or may indicate a corresponding subcarrier spacing sorted in a measurement value sequence.

Optionally, before S**401*a*** that the base station receives the reference signal measurement value that is corresponding to the at least one subcarrier spacing and that is sent by the UE, the method may further include the following:

The base station notifies the UE of a first triggering manner; and the base station receives the reference signal measurement value that is corresponding to the at least one subcarrier spacing and that is sent by the UE based on the first triggering manner.

Specifically, the first triggering manner may include, for example, at least one of the following trigging manners: a measurement value reporting period, a measurement value reporting condition, preset signaling, and the like.

The measurement value reporting condition may include any one of the following conditions: A measurement value exceeds a preset threshold, a difference between a measurement value corresponding to a target subcarrier spacing and a measurement value corresponding to a current subcarrier spacing exceeds a preset threshold, a difference between a measurement value corresponding to a target subcarrier spacing and a measurement value corresponding to a current subcarrier spacing falls within a preset range, a block error rate (BLER) of a current channel exceeds a preset threshold, an SINR of a current channel exceeds a preset threshold, or an RSRP of a current channel exceeds a preset threshold.

The preset signaling may include signaling in which a value of a preset flag information bit is a preset value such as 1. The signaling may be any one of the following: a random access response, a message 4 in a random access procedure, RRC signaling, a MAC CE, or a physical downlink control channel. The physical downlink control channel may be any one of the following: a physical downlink control channel corresponding to a random access response, a physical layer downlink control channel corresponding to a message 4 in a random access procedure, a physical downlink control channel scrambled by a user radio network temporary identifier (RNTI), or a physical downlink control channel scrambled by a common RNTI, such as any one of a paging RNTI, a system information RNTI, or an access RNTI.

Optionally, before S401*a* that the base station receives the reference signal measurement value that is corresponding to the at least one subcarrier spacing and that is sent by the UE, the method may further include the following:

S401*b*. The base station sends, to the UE, a reference signal corresponding to the at least one subcarrier spacing.

Specifically, the base station may send a reference signal to the UE by using each subcarrier spacing, to send the reference signal corresponding to the at least one subcarrier spacing.

Figure 5:
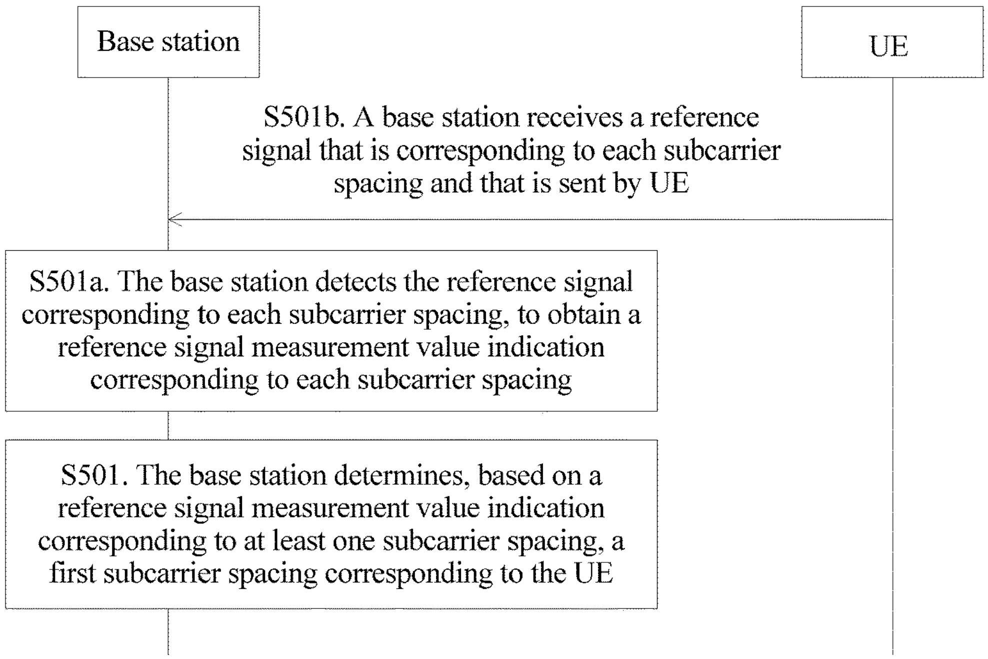
FIG. 5 is a flowchart of another parameter determining method according to Embodiment 2 of this application.

Alternatively, Embodiment 2 of this application may further provide a parameter determining method. FIG. 5 is a flowchart of another parameter determining method according to Embodiment 2 of this application. As shown in FIG. 5, the method is based on the foregoing parameter determining method. S101 that the base station determines a first subcarrier spacing corresponding to the UE includes the following step:

S501. The base station determines, based on a reference signal measurement value indication corresponding to at least one subcarrier spacing, the first subcarrier spacing corresponding to the UE.

Specifically, a specific implementation process of S501 is similar to that of S401. For detailed descriptions, refer to the foregoing descriptions. Details are not described herein again.

Optionally, before S501 that the base station determines, based on a reference signal measurement value corresponding to at least one subcarrier spacing, the first subcarrier spacing corresponding to the UE, the method may further include the following:

S501*a*. The base station detects a reference signal corresponding to each subcarrier spacing, to obtain a reference signal measurement value indication corresponding to each subcarrier spacing.

Optionally, before S501*a* that the base station detects a reference signal corresponding to each subcarrier spacing, to obtain a reference signal measurement value indication corresponding to each subcarrier spacing, the method further includes the following:

S501*b*. The base station receives the reference signal that is corresponding to each subcarrier spacing and that is sent by the UE.

Optionally, before S501*b* that the base station receives the reference signal that is corresponding to each subcarrier spacing and that is sent by the UE, the method may further include the following:

The base station notifies the UE of a second triggering manner; and the base station receives the reference signal that is corresponding to each subcarrier spacing and that is sent by the UE based on the second triggering manner.

Specifically, the second triggering manner may include, for example, at least one of the following trigging manners: a reference signal sending period, a reference signal sending condition, preset signaling, and the like.

The reference signal sending condition may include any one of the following conditions: A BLER of a current channel exceeds a preset threshold, an SINR of a current channel exceeds a preset threshold, or an RSRP of a current channel exceeds a preset threshold.

The preset signaling may include signaling in which a value of a preset flag information bit is a preset value such as 1. The signaling may be any one of the following: a random access response, a message 4 in a random access procedure, RRC signaling, MAC CE signaling, or a physical downlink control channel. The physical downlink control channel may be any one of the following: a physical downlink control channel corresponding to a random access response, a physical layer downlink control channel corresponding to a message 4 in a random access procedure, a physical downlink control channel scrambled by a user RNTI, or a physical downlink control channel scrambled by a common RNTI, such as any one of a paging RNTI, a system information RNTI, or an access RNTI.

In any one of the foregoing parameter determining methods, the first subcarrier spacing is a reference subcarrier spacing or a subcarrier spacing used for a channel. The reference subcarrier spacing may include a common-level reference subcarrier spacing and/or a UE-level reference subcarrier spacing.

The common-level reference subcarrier spacing is a subcarrier spacing used for data transmission on at least one common channel. The at least one common channel may be a common channel of all users in at least one cell or a common channel of at least one user group. Common information such as common control information of all the users in the at least one cell or all users in the at least one user group may be transmitted on each common channel. Each user group may include at least one user. The common channel may include, for example, any one of a synchronization signal, a broadcast channel, a random access channel, a common control channel, or a common data channel. The common control channel may be a control channel obtained by searching common search space or a control channel scrambled by a common RNTI, such as any one of a paging RNTI, a system information RNTI, or an access RNTI. The common data channel may be a data channel that carries the common information of the at least one cell or user group.

The UE-level reference subcarrier spacing is a subcarrier spacing used for data transmission on a user-level channel. Independent information of a user may be transmitted on the user-level channel. Data transmitted on the user-level channel may include a user-level reference signal, a user-level control channel, and a user-level data channel. The user-level reference signal may be used to transmit independent reference information of the user, the user-level control channel may be used to transmit independent control information of the user, and the user-level data channel may be used to transmit independent data information of the user. The UE-level reference subcarrier spacing may include a subcarrier spacing used for data transmission on at least one user-level channel. In other words, for one user, there may be at least one user-level channel that uses the UE-level subcarrier spacing, and each user-level channel may have a corresponding subcarrier spacing.

If the first subcarrier spacing is a common-level reference subcarrier spacing, the subframe length determined by the UE based on the first subcarrier spacing is a length of a common-level subframe, and may also be referred to as a length of a cell-level subframe.

If the first subcarrier spacing is a UE-level reference subcarrier spacing, the subframe length determined by the UE based on the first subcarrier spacing is a length of a UE-level subframe.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Specifically, the control channel may include a common control channel and a user-level control channel. The data channel may include a common data channel and a user-level data channel.

The common control channel may be a control channel obtained by searching common search space or performing detection in common search space, or a control channel scrambled by a common RNTI, such as any one of a paging RNTI, a system information RNTI, or an access RNTI. The common data channel may be a data channel that carries common information. The user-level control channel may be a control channel that carries user-level scheduling signaling or feedback signaling. The user-level data channel may be a data channel that carries user-level information.

Alternatively, S101 that the base station determines a first subcarrier spacing corresponding to the UE may include the following:

The base station determines, based on a third subcarrier spacing and a relationship between the third subcarrier spacing and the first subcarrier spacing, the first subcarrier spacing corresponding to the UE, where the third subcarrier spacing is a subcarrier spacing used for a first channel, the first subcarrier spacing is a subcarrier spacing used for a second channel, and the first channel and the second channel are different channels.

Specifically, the relationship between the third subcarrier spacing and the first subcarrier spacing may be a relative relationship between the subcarrier spacing used for the first channel and the subcarrier spacing used for the second channel. The relative relationship between the subcarrier spacing used for the first channel and the subcarrier spacing used for the second channel may include the following: The subcarrier spacing used for the second channel is the same as the subcarrier spacing used for the first channel, or the subcarrier spacing used for the second channel is an integer multiple such as 2^n times of the subcarrier spacing used for the first channel, where n is any integer from −2 to 6.

For example, if the third subcarrier spacing is a subcarrier spacing used for a synchronization signal, and the first subcarrier spacing is a subcarrier spacing used for a broadcast channel, the subcarrier spacing used for a broadcast channel is determined based on the relationship between the third subcarrier spacing and the first subcarrier spacing.

If the third subcarrier spacing is a subcarrier spacing used for a synchronization signal/broadcast channel, and the first subcarrier spacing is a subcarrier spacing used for a random access channel, the subcarrier spacing used for an access channel is determined based on the relationship between the third subcarrier spacing and the first subcarrier spacing.

If the third subcarrier spacing is a subcarrier spacing used for a synchronization signal/broadcast channel/random access channel, and the first subcarrier spacing is a subcarrier spacing used for a common control channel, the subcarrier spacing used for a common control channel is determined based on the relationship between the third subcarrier spacing and the first subcarrier spacing.

If the third subcarrier spacing is a subcarrier spacing used for a data channel, and the first subcarrier spacing is a subcarrier spacing used for a reference signal, the subcarrier spacing used for a reference signal is determined based on the relationship between the third subcarrier spacing and the first subcarrier spacing.

Optionally, S101 that the base station determines a first subcarrier spacing corresponding to the UE may include the following:

The base station determines, based on a CP type used for a first channel and a relationship between the CP type used for the first channel and a CP type used for a second channel, the CP type used for the second channel as a CP type corresponding to the UE.

Specifically, the relationship between the CP type used for the first channel and the CP type used for the second channel may be as follows: The CP type used for the second channel is the same as or different from the CP type used for the first channel. For example, if the CP type used for the first channel is an NCP, and the CP type used for the second channel is the same as the CP type used for the first channel, the base station may determine that the CP type used for the second channel is an NCP, in other words, the CP type corresponding to the UE is an NCP.

Optionally, in the foregoing parameter determining method, the first channel and the second channel are two different channels of the following: a synchronization signal, a broadcast channel, a random access channel, a control channel, a data channel, and a reference signal.

Optionally, S102 that the base station notifies the UE of the first subcarrier spacing may include the following:

The base station notifies, by using signaling carried in a broadcast channel, the UE that the first subcarrier spacing is the subcarrier spacing used for a data channel.

Specifically, if the UE receives the signaling that is carried in the broadcast channel and that is sent by the base station, the UE may determine that the first subcarrier spacing is the subcarrier spacing used for a data channel.

Alternatively, S102 that the base station notifies the UE of the first subcarrier spacing may include the following:

The base station notifies, by using signaling carried in a broadcast channel or system information, the UE that the first subcarrier spacing is the subcarrier spacing used for a control channel or the subcarrier spacing used for a random access channel.

Specifically, if the UE receives the signaling that is carried in the broadcast channel or the system information and that is sent by the base station, the UE may determine that the first subcarrier spacing is the subcarrier spacing used for a control channel or the subcarrier spacing used for a random access channel.

Alternatively, S102 that the base station notifies the UE of the first subcarrier spacing may include the following:

The base station notifies, by using higher layer signaling, the UE that the first subcarrier spacing is the subcarrier spacing used for a control channel, a data channel, or a reference signal.

Specifically, if the UE receives the higher layer signaling sent by the base station, the UE may determine that the first subcarrier spacing is the subcarrier spacing used for a control channel, a data channel, or a reference signal.

Alternatively, S102 that the base station notifies the UE of the first subcarrier spacing may include the following:

The base station notifies, by using signaling carried in a control channel, the UE that the first subcarrier spacing is the parameter used for a data channel and/or the subcarrier spacing used for a reference signal.

Specifically, if the UE receives the signaling that is carried in the control channel and that is sent by the base station, the UE may determine that the first subcarrier spacing is the parameter used for a data channel and/or the subcarrier spacing used for a reference signal.

Optionally, S102 that the base station notifies the UE of the first subcarrier spacing may include the following:

The base station notifies the UE of the first subcarrier spacing by sending at least one piece of the following information to the UE: a value of the first subcarrier spacing; a relative relationship between the first subcarrier spacing and a current subcarrier spacing of the UE; a relative relationship between the first subcarrier spacing and a common reference subcarrier spacing; and a relative relationship between the first subcarrier spacing and a subcarrier spacing used for a preset channel.

The relative relationship between the first subcarrier spacing and the current subcarrier spacing of the UE may include the following: The first subcarrier spacing is the same as the current subcarrier spacing of the UE, or the first subcarrier spacing is an integer multiple such as 2^n times of the current subcarrier spacing of the UE, where n is any integer from −2 to 6.

The relative relationship between the first subcarrier spacing and the common reference subcarrier spacing may include the following: The first subcarrier spacing is the same as the common reference subcarrier spacing, or the first subcarrier spacing is an integer multiple such as 2^n times of the common reference subcarrier spacing, where n is any integer from −2 to 6.

The relative relationship between the first subcarrier spacing and the subcarrier spacing used for a preset channel may include the following: The first subcarrier spacing is the same as the subcarrier spacing used for a preset channel, or the first subcarrier spacing is an integer multiple such as 2^n times of the subcarrier spacing used for a preset channel, where n is any integer from −2 to 6.

Optionally, the method may further include the following:

The base station notifies the UE of effective time of the first subcarrier spacing and/or an effective channel of the first subcarrier spacing.

Specifically, the effective time may include, for example, any one of the $x^{th}$ subframe starting from current time, x ms later after current time, the $x^{th}$ transmission starting from current time, or transmission of a channel x. The effective channel may include, for example, any one of a data channel, a control channel, or a reference signal.

In the parameter determining methods provided in Embodiment 2 of this application, a plurality of implementations of determining the first subcarrier spacing corresponding to the UE are provided, so that in a plurality of scenarios in the methods of this application, the UE can accurately learn of, in a multi-subcarrier-spacing system, a subcarrier spacing used for data transmission. This can effectively ensure that the UE performs a corresponding service, thereby meeting a corresponding service requirement. In addition, the methods in this embodiment further provide a plurality of manners of notifying the UE of the first subcarrier spacing, to effectively ensure that the UE can accurately determine the first subcarrier spacing. This can effectively ensure that the UE performs the corresponding service, thereby meeting the corresponding service requirement. Furthermore, in the methods, the base station further notifies the UE of the effective time of the first subcarrier spacing and/or the effective channel of the first subcarrier spacing. Therefore, the UE can effectively control subcarrier spacing use, and it can be effectively ensured that the UE accurately uses the first subcarrier spacing at accurate time on an accurate channel. This can effectively ensure that the UE performs the corresponding service, thereby meeting the corresponding service requirement.

Figure 6:
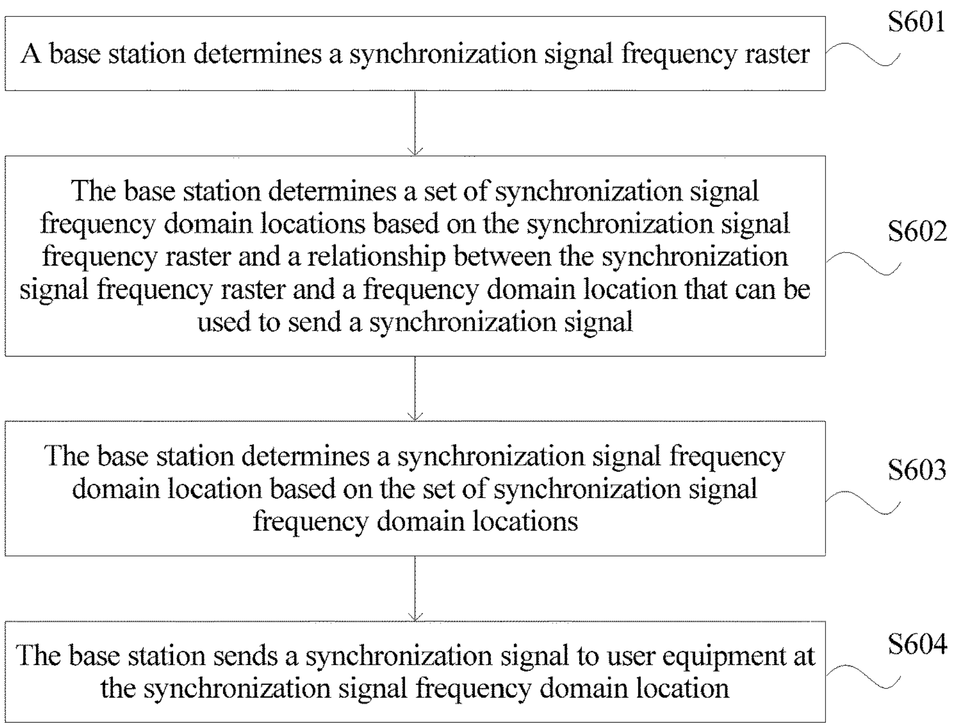
FIG. 6 is a flowchart of a signal transmission method according to Embodiment 3 of this application.

Embodiment 3 of this application provides a signal transmission method. FIG. 6 is a flowchart of a signal transmission method according to Embodiment 3 of this application. As shown in FIG. 6, the signal transmission method may include the following steps:

S601. A base station determines a synchronization signal frequency raster.

S602. The base station determines a set of synchronization signal frequency domain locations based on the synchronization signal frequency raster and a relationship between the synchronization signal frequency raster and a frequency domain location that can be used to send a synchronization signal.

The set of synchronization signal frequency domain locations is a set of frequency domain locations for sending a synchronization signal or a set of frequency domain locations that can be used to send a synchronization signal.

S603. The base station determines a synchronization signal frequency domain location based on the set of synchronization signal frequency domain locations.

S604. The base station sends a synchronization signal to user equipment at the synchronization signal frequency domain location.

The base station determines a candidate synchronization signal frequency or a synchronization signal frequency, and selects one or more synchronization signal frequencies to send the synchronization signal. The selection method includes a predefined method, or a manner of performing determining based on a subcarrier spacing of the candidate location, or the like.

In the signal transmission method provided in Embodiment 3 of this application, the base station determines the synchronization signal frequency raster, determines the set of synchronization signal frequency domain locations based on the synchronization signal frequency raster and the relationship between the synchronization signal frequency raster and the frequency domain location that can be used to send a synchronization signal, determines the synchronization signal frequency domain location based on the set of synchronization signal frequency domain locations, and then sends the synchronization signal to the user equipment at the synchronization signal frequency domain location. In this method, the UE may accurately learn of, in a multi-subcarrier-spacing system, a frequency raster for performing synchronization signal detection, and this ensures accuracy of synchronization signal detection.

Optionally, S601 that a base station determines a synchronization signal frequency raster includes the following:

The base station determines the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Specifically, if subcarrier spacings that can be used to transmit a synchronization signal and are on the current transmission frequency band of the base station are the same, a frequency raster of a synchronization signal is an integer multiple of a channel raster spacing and the subcarrier spacing that can be used to transmit a synchronization signal. If subcarrier spacings that can be used to transmit a synchronization signal and are on the current transmission frequency band of the base station are different, raster frequencies of all synchronization signals are different, and a frequency raster of each synchronization signal is an integer multiple of a least common multiple of a channel raster spacing and a subcarrier spacing that can be used to transmit the synchronization signal, or a frequency raster of each synchronization signal is an integer multiple of a least common multiple of a channel raster spacing and a maximum value of all the subcarrier spacings that can be used to transmit a synchronization signal.

Optionally, the synchronization signal is a group of synchronization signals that include at least one synchronization signal, and that the base station determines the synchronization signal frequency raster based on a synchronization signal subcarrier spacing includes the following:

The base station independently determines a frequency raster of each synchronization signal based on a subcarrier spacing of the synchronization signal; or the base station determines frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Specifically, a frequency difference between a highest frequency, a center frequency, or a lowest frequency of each synchronization signal and at least one synchronization signal frequency raster is fixed, and the difference may be preset.

Optionally, S602 that the base station determines a set of synchronization signal frequency domain locations based on the synchronization signal frequency raster and a relationship between the synchronization signal frequency raster and a frequency domain location that can be used to send a synchronization signal includes the following:

The base station determines the set of synchronization signal frequency domain locations based on a synchronization signal bandwidth.

A difference between frequencies into which different synchronization signals are mapped is greater than or equal to a larger value of a bandwidth occupied by one of the synchronization signals and a synchronization signal frequency raster. Alternatively, a difference between frequencies into which different synchronization signals are mapped is greater than or equal to a largest value among bandwidths occupied by two of the different synchronization signals and synchronization signal frequency rasters.

Optionally, S602 that the base station determines a set of synchronization signal frequency domain locations based on the synchronization signal frequency raster and a relationship between the synchronization signal frequency raster and a frequency domain location that can be used to send a synchronization signal includes the following:

The base station determines the set of synchronization signal frequency domain locations based on a center frequency, a highest frequency, or a lowest frequency of a transmission frequency band on which a synchronization signal is located.

Optionally, before S604 that the base station sends a synchronization signal to user equipment at the synchronization signal frequency domain location, the method further includes the following:

The base station sends configuration information on another transmission frequency band, so that the user equipment determines a set of candidate synchronization signal locations or the synchronization signal frequency raster. The configuration information is used to configure the set of synchronization signal frequency domain locations on an operation frequency band on which the synchronization signal is located.

Specifically, the base station sends, to the user equipment on a second transmission frequency band by using higher layer signaling of a user or broadcast information, frequency or possible frequency for a synchronization signal of a first transmission frequency band. The first transmission frequency band includes a high frequency band, such as a 30 GHz transmission frequency band and/or a 70 GHz transmission frequency band. The second transmission frequency band includes a low frequency band, such as a transmission frequency band below 6 GHz.

Optionally, before S604 that the base station sends a synchronization signal to user equipment at the synchronization signal frequency domain location, the method further includes the following:

The base station sends configuration information to the user equipment by using another base station, so that the user equipment determines a set of candidate synchronization signal locations or the synchronization signal frequency raster. The configuration information is used to configure the set of candidate synchronization signal locations or the synchronization signal frequency raster on an operation frequency band of the base station that sends the synchronization signal. The another base station is a base station other than the base station that sends the synchronization signal.

Specifically, the another base station may send, to the user equipment on a second transmission frequency band by using higher layer signaling of a user or broadcast information, a synchronization signal location or a possible synchronization signal location that is on a first transmission frequency band of the base station.

Figure 7:
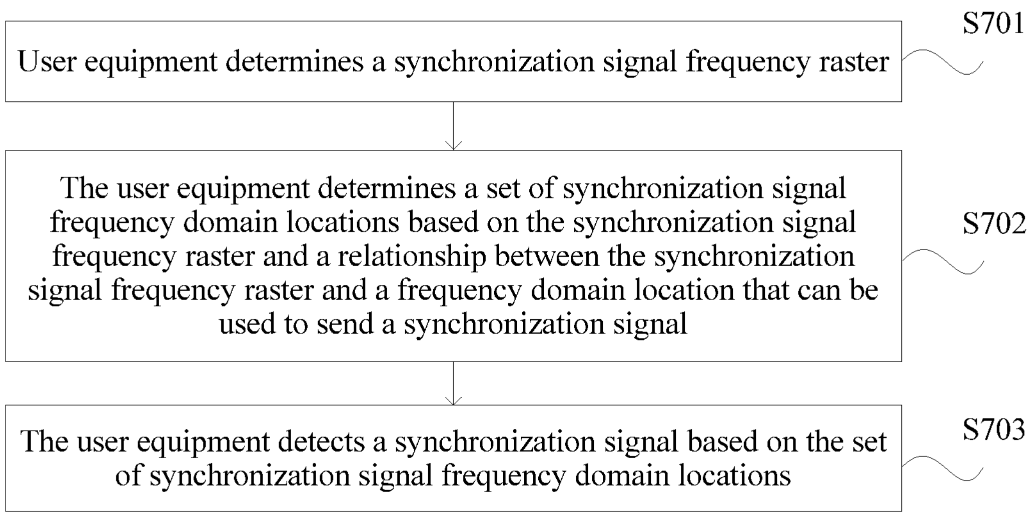
FIG. 7 is a flowchart of a signal transmission method according to Embodiment 4 of this application.

Embodiment 4 of this application further provides a signal transmission method. FIG. 7 is a flowchart of a signal transmission method according to Embodiment 4 of this application. As shown in FIG. 7, the signal transmission method may include the following steps:

S701. User equipment determines a synchronization signal frequency raster.

S702. The user equipment determines a set of synchronization signal frequency domain locations based on the synchronization signal frequency raster and a relationship between the synchronization signal frequency raster and a frequency domain location that can be used to send a synchronization signal.

The set of synchronization signal frequency domain locations is a set of frequency domain locations for sending a synchronization signal or a set of frequency domain locations that can be used to send a synchronization signal.

S703. The user equipment detects a synchronization signal based on the set of synchronization signal frequency domain locations.

Optionally, S701 that user equipment determines a synchronization signal frequency raster includes the following:

The user equipment determines the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal, and that the user equipment determines the synchronization signal frequency raster based on a synchronization signal subcarrier spacing includes the following:

The user equipment independently determines a frequency raster of each synchronization signal based on a subcarrier spacing of the synchronization signal; or the user equipment determines frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, S702 that the user equipment determines a set of synchronization signal frequency domain locations based on the synchronization signal frequency raster and a relationship between the synchronization signal frequency raster and a frequency domain location that can be used to send a synchronization signal may include the following:

The user equipment determines the set of synchronization signal frequency domain locations based on a synchronization signal bandwidth.

Optionally, S702 that the user equipment determines a set of synchronization signal frequency domain locations based on the synchronization signal frequency raster and a relationship between the synchronization signal frequency raster and a frequency domain location that can be used to send a synchronization signal may include the following:

The user equipment determines the set of synchronization signal frequency domain locations based on a center frequency, a highest frequency, or a lowest frequency of a transmission frequency band on which a synchronization signal is located.

Optionally, before S703 that the user equipment detects a synchronization signal based on the set of synchronization signal frequency domain locations, the method may further include the following:

The user equipment receives configuration information on another transmission frequency band, to determine a set of candidate synchronization signal locations or the synchronization signal frequency raster, where the configuration information is used to configure the set of synchronization signal frequency domain locations on an operation frequency band on which the synchronization signal is located; or the user equipment receives configuration information from another base station, to determine a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

The signal transmission method provided in Embodiment 4 of this application is a method executed by a peer device, namely, the user equipment, in Embodiment 3. For a specific implementation process and beneficial effects thereof, refer to the foregoing embodiment. Details are not described herein again.

Figure 8:
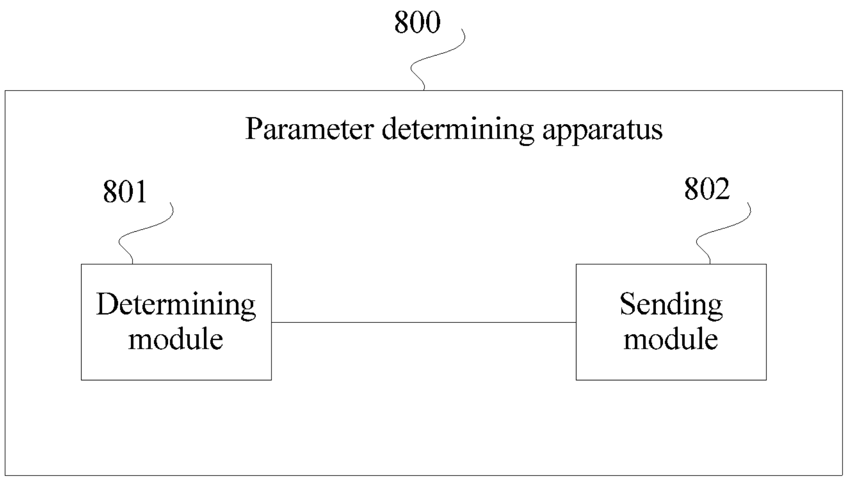
FIG. 8 is a schematic structural diagram of a parameter determining apparatus according to Embodiment 5 of this application.

Embodiment 5 of this application provides a parameter determining apparatus. FIG. 8 is a schematic structural diagram of a parameter determining apparatus according to Embodiment 5 of this application. As shown in FIG. 8, the parameter determining apparatus 800 may include: a determining module 801, configured to determine a first subcarrier spacing corresponding to UE; and a sending module 802, configured to notify the UE of the first subcarrier spacing.

Optionally, the parameter determining apparatus 800 further includes: a first receiving module, configured to receive a random access channel sent by the UE, where the random access channel is a channel sent by the UE by using a second subcarrier spacing.

The determining module 801 is further configured to determine, based on the second subcarrier spacing, the first subcarrier spacing corresponding to the UE.

Optionally, the parameter determining apparatus 800 further includes: a second receiving module, configured to receive a request sent by the UE, where the request includes indication information corresponding to a subcarrier spacing requested by the UE.

The determining module 801 is further configured to determine, based on the indication information corresponding to the subcarrier spacing requested by the UE, the first subcarrier spacing corresponding to the UE.

Optionally, the determining module 801 is specifically configured to determine, based on a reference signal measurement value corresponding to at least one subcarrier spacing, the first subcarrier spacing corresponding to the UE.

Optionally, the determining module 801 is further configured to determine, based on a reference signal measurement value corresponding to at least one CP type, a CP type corresponding to the UE.

The sending module 802 is further configured to notify the UE of the CP type corresponding to the UE.

Optionally, the parameter determining apparatus 800 further includes: a third receiving module, configured to receive at least one of the reference signal measurement value corresponding to the at least one subcarrier spacing, wherein the at least one of the reference signal measurement value is sent by the UE.

Optionally, the sending module 802 is further configured to send, to the UE, a reference signal corresponding to the at least one subcarrier spacing.

Optionally, the parameter determining apparatus 800 further includes: a detection module, configured to detect a reference signal corresponding to each subcarrier spacing in the at least one subcarrier spacing, to obtain a reference signal measurement value corresponding to each subcarrier spacing.

Optionally, the parameter determining apparatus 800 further includes: a fourth receiving module, configured to receive the reference signal that is corresponding to each subcarrier spacing and that is sent by the UE.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the determining module 801 is further configured to determine, based on a third subcarrier spacing and a relationship between the third subcarrier spacing and the first subcarrier spacing, the first subcarrier spacing corresponding to the UE, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the sending module 802 is further configured to notify, by using signaling carried in a broadcast channel, the UE that the first subcarrier spacing is the subcarrier spacing used for a data channel; or the sending module 802 is further configured to notify, by using signaling carried in a broadcast channel or system information, the UE that the first subcarrier spacing is the subcarrier spacing used for a control channel or the subcarrier spacing used for a random access channel; or the sending module 802 is further configured to notify, by using higher layer signaling, the UE that the first subcarrier spacing is the subcarrier spacing used for a control channel, a data channel, or a reference signal; or the sending module 802 is further configured to notify, by using signaling carried in a control channel, the UE that the first subcarrier spacing is the parameter used for a data channel and/or the subcarrier spacing used for a reference signal.

Optionally, the sending module 802 is further configured to notify the UE of the first subcarrier spacing by sending at least one piece of the following information to the UE: a value of the first subcarrier spacing; a relative relationship between the first subcarrier spacing and a current subcarrier spacing of the UE; a relative relationship between the first subcarrier spacing and a common reference subcarrier spacing; and a relative relationship between the first subcarrier spacing and a subcarrier spacing used for a preset channel.

Optionally, the sending module 802 is further configured to notify the UE of effective time of the first subcarrier spacing and/or an effective channel of the first subcarrier spacing.

The parameter determining apparatus provided in Embodiment 5 of this application may execute the parameter determining method executed by the base station in Embodiment 1 or Embodiment 2. For a specific implementation process and beneficial effects thereof, refer to the foregoing embodiment. Details are not described herein again.

Figure 9:
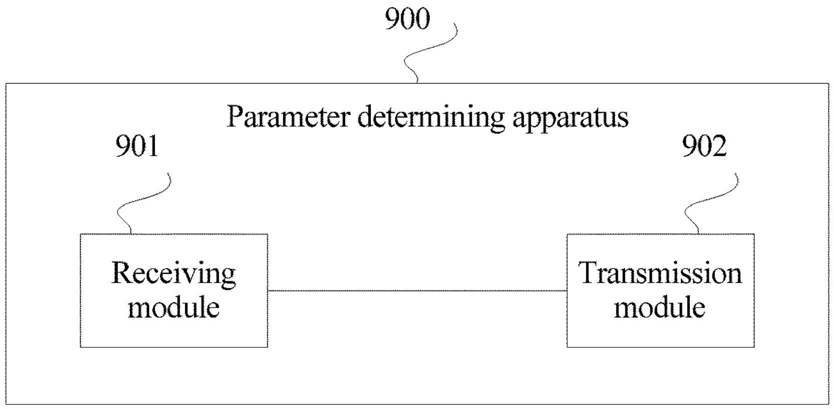
FIG. 9 is a schematic structural diagram of a parameter determining apparatus according to Embodiment 6 of this application.

Embodiment 6 of this application further provides a parameter determining apparatus. FIG. 9 is a schematic structural diagram of a parameter determining apparatus according to Embodiment 6 of this application. As shown in FIG. 9, the parameter determining apparatus 900 includes: a receiving module 901, configured to obtain a first subcarrier spacing notified by a base station; and a transmission module 902, configured to perform data transmission with the base station based on the first subcarrier spacing.

Optionally, the parameter determining apparatus 900 further includes: a first sending module, configured to send a random access channel to the base station by using a second subcarrier spacing, so that the base station determines the first subcarrier spacing based on the second subcarrier spacing.

Optionally, the parameter determining apparatus 900 further includes: a second sending module, configured to send a request to the base station, where the request includes indication information corresponding to a subcarrier spacing requested by the UE, and the request is used by the base station to determine the first subcarrier spacing based on the indication information corresponding to the subcarrier spacing requested by the UE.

Optionally, the first subcarrier spacing is a subcarrier spacing determined by the base station based on a reference signal measurement value corresponding to at least one subcarrier spacing.

Optionally, the receiving module 901 is further configured to obtain a cyclic prefix CP type notified by the base station, where the CP type is a CP type determined by the base station based on a reference signal measurement value corresponding to at least one CP type.

Optionally, the parameter determining apparatus 900 further includes: a third sending module, configured to send, to the base station, at least one of the reference signal measurement value corresponding to the at least one subcarrier spacing.

Optionally, the receiving module 901 is further configured to receive a reference signal that is corresponding to the at least one subcarrier spacing and that is sent by the base station.

Optionally, a reference signal measurement value corresponding to each subcarrier spacing in the at least one subcarrier spacing is obtained by detecting, by the base station, a reference signal corresponding to each subcarrier spacing.

Optionally, the parameter determining apparatus 900 further includes: a fourth sending module, configured to send, to the base station, a reference signal corresponding to the at least one subcarrier spacing.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the first subcarrier spacing is a subcarrier spacing determined by the base station based on a third subcarrier spacing and a relationship between the third subcarrier spacing and the first subcarrier spacing, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the receiving module 901 is specifically configured to determine, based on signaling that is carried in a broadcast channel and that is sent by the base station, that the first subcarrier spacing is the parameter used for a data channel; or the receiving module 901 is specifically configured to determine, based on signaling that is carried in a broadcast channel or system information and that is sent by the base station, that the first subcarrier spacing is the parameter used for a control channel or the parameter used for to random access channel; or the receiving module 901 is specifically configured to determine, based on higher layer signaling sent by the base station, that the first subcarrier spacing is the parameter used for a control channel, a data channel, or a reference signal; or the receiving module 901 is specifically configured to determine, based on signaling that is carried in a control channel and that is sent by the base station, that the first subcarrier spacing is the parameter used for a data channel and/or the parameter used for a reference signal.

Optionally, the receiving module 901 is further configured to determine the first subcarrier spacing based on at least one piece of the following information sent by the base station: a value of the first parameter, a relative relationship between the first parameter and a current parameter of the UE, a relative relationship between the first parameter and a common reference parameter, and a relative relationship between the first parameter and a parameter used for a preset channel.

Optionally, the receiving module 901 is further configured to obtain effective time of the first subcarrier spacing and/or an effective channel of the first subcarrier spacing that are/is notified by the base station.

The parameter determining apparatus provided in Embodiment 6 of this application may execute the parameter determining method executed by the UE in Embodiment 1 or Embodiment 2. For a specific implementation process and beneficial effects thereof, refer to the foregoing embodiment. Details are not described herein again.

Figure 10:
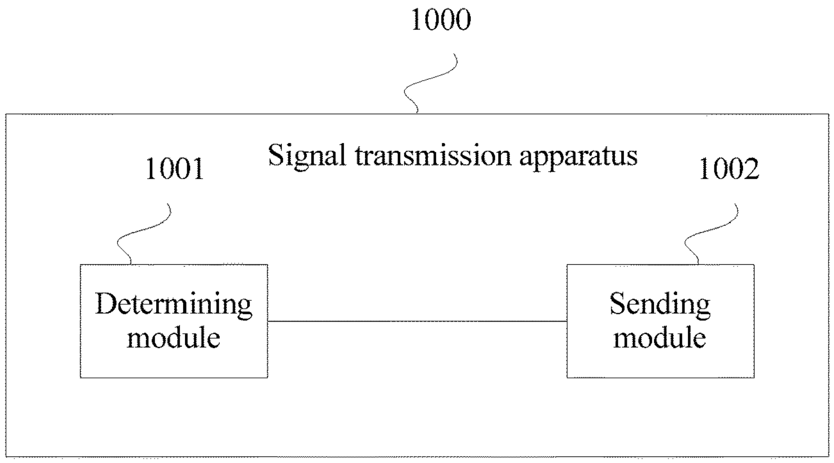
FIG. 10 is a schematic structural diagram of a signal transmission apparatus according to Embodiment 7 of this application.

Embodiment 7 of this application further provides a signal transmission apparatus. FIG. 10 is a schematic structural diagram of a signal transmission apparatus according to Embodiment 7 of this application. As shown in FIG. 10, the signal transmission apparatus 1000 may include: a determining module 1001, configured to: determine a synchronization signal frequency raster; determine a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal; and determine a synchronization signal frequency domain location based on the set of synchronization signal frequency domain locations; and a sending module 1002, configured to send a synchronization signal to user equipment.

Optionally, the determining module 1001 is specifically configured to determine the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal, and the determining module 1001 is specifically configured to independently determine a frequency raster of each synchronization signal based on a subcarrier spacing of the synchronization signal; or the determining module 1001 is specifically configured to determine frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the determining module 1001 is specifically configured to determine the set of synchronization signal frequency domain locations based on a synchronization signal bandwidth.

Optionally, the determining module 1001 is specifically configured to determine the set of synchronization signal frequency domain locations based on a center frequency, a highest frequency, or a lowest frequency of a transmission frequency band on which a synchronization signal is located.

Optionally, the sending module 1002 is further configured to send configuration information on another transmission frequency band, so that the user equipment determines a set of candidate synchronization signal locations or the synchronization signal frequency raster, where the configuration information is used to configure the set of synchronization signal frequency domain locations on an operation frequency band on which the synchronization signal is located; or the sending module 1002 is further configured to send configuration information to the user equipment by using another base station, so that the user equipment determines a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

The signal transmission apparatus provided in Embodiment 7 of this application may execute the signal transmission method executed by the base station in Embodiment 3. For a specific implementation process and beneficial effects thereof, refer to the foregoing embodiment. Details are not described herein again.

Figure 11:
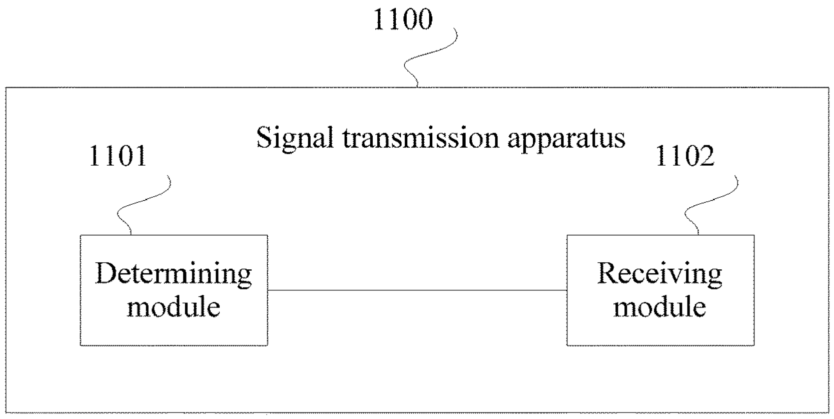
FIG. 11 is a schematic structural diagram of a signal transmission apparatus according to Embodiment 8 of this application.

Embodiment 8 of this application further provides a signal transmission apparatus. FIG. 11 is a schematic structural diagram of a signal transmission apparatus according to Embodiment 8 of this application. As shown in FIG. **1*i*, the signal transmission apparatus 1100 may include: a determining module 1101, configured to: determine a synchronization signal frequency raster, and determine a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal; and a receiving module 1102**, configured to detect a synchronization signal based on the set of synchronization signal frequency domain locations.

Optionally, the determining module 1101 is specifically configured to determine the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal, and the determining module 1101 is specifically configured to independently determine a frequency raster of each synchronization signal based on a subcarrier spacing of the synchronization signal; or the determining module 1101 is specifically configured to determine frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the determining module 1101 is specifically configured to determine the set of synchronization signal frequency domain locations based on a synchronization signal bandwidth.

Optionally, the determining module 1101 is specifically configured to determine the set of synchronization signal frequency domain locations based on a center frequency, a highest frequency, or a lowest frequency of a transmission frequency band on which a synchronization signal is located.

Optionally, the receiving module 1102 is further configured to receive configuration information on another transmission frequency band, to determine a set of candidate synchronization signal locations or the synchronization signal frequency raster, where the configuration information is used to configure the set of synchronization signal frequency domain locations on an operation frequency band on which the synchronization signal is located; or the receiving module 1102 is further configured to receive configuration information from another base station, to determine a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

The signal transmission apparatus provided in Embodiment 8 of this application may execute the signal transmission method executed by the user equipment in Embodiment 4. For a specific implementation process and beneficial effects thereof, refer to the foregoing embodiment. Details are not described herein again.

Figure 12:
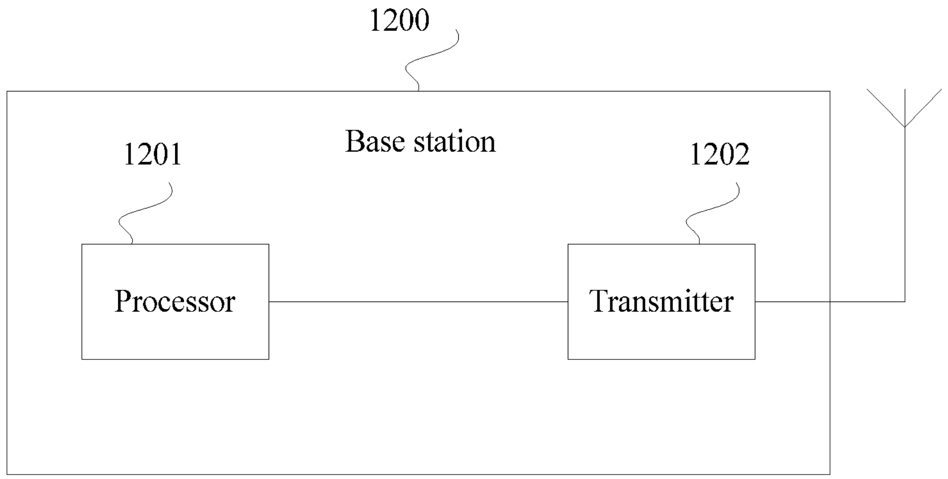
FIG. 12 is a schematic structural diagram of a base station according to Embodiment 9 of this application.

Embodiment 9 of this application further provides a base station. FIG. 12 is a schematic structural diagram of a base station according to Embodiment 9 of this application. As shown in FIG. 12, the base station 1200 may include a processor 1201 and a transmitter 1202. The processor 1201 is connected to the transmitter 1202.

The processor 1201 is configured to determine a first subcarrier spacing corresponding to UE.

The transmitter 1202 is configured to notify the UE of the first subcarrier spacing.

Optionally, the base station 1200 further includes: a receiver, configured to receive a random access channel sent by the UE, where the random access channel is a channel sent by the UE by using a second subcarrier spacing.

The processor 1201 is further configured to determine, based on the second subcarrier spacing, the first subcarrier spacing corresponding to the UE.

Optionally, the base station 1200 further includes: a receiver, configured to receive a request sent by the UE, where the request includes indication information corresponding to a subcarrier spacing requested by the UE.

The processor 1201 is further configured to determine, based on the indication information corresponding to the subcarrier spacing requested by the UE, the first subcarrier spacing corresponding to the UE.

Optionally, the processor 1201 is further configured to determine, based on a reference signal measurement value corresponding to at least one subcarrier spacing, the first subcarrier spacing corresponding to the UE.

Optionally, the processor 1201 is further configured to determine, based on a reference signal measurement value corresponding to at least one cyclic prefix CP type, a CP type corresponding to the UE.

The transmitter 1202 is further configured to notify the UE of the CP type corresponding to the UE.

Optionally, the base station 1200 further includes: a receiver, configured to receive at least one of the reference signal measurement value corresponding to the at least one subcarrier spacing, wherein the at least one of the reference signal measurement value is sent by the UE.

Optionally, the transmitter 1202 is further configured to send, to the UE, a reference signal corresponding to the at least one subcarrier spacing.

Optionally, the processor 1201 is further configured to detect a reference signal corresponding to each subcarrier spacing in the at least one subcarrier spacing, to obtain a reference signal measurement value corresponding to each subcarrier spacing.

Optionally, the base station 1200 further includes: a receiver, configured to receive the reference signal that is corresponding to each subcarrier spacing and that is sent by the UE.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the processor 1201 is specifically configured to determine, based on a third subcarrier spacing and a relationship between the third subcarrier spacing and the first subcarrier spacing, the first subcarrier spacing corresponding to the UE, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the transmitter 1202 is specifically configured to notify, by using signaling carried in a broadcast channel, the UE that the first subcarrier spacing is the subcarrier spacing used for a data channel; or the transmitter 1202 is specifically configured to notify, by using signaling carried in a broadcast channel or system information, the UE that the first subcarrier spacing is the subcarrier spacing used for a control channel or the subcarrier spacing used for a random access channel; or the transmitter 1202 is specifically configured to notify, by using higher layer signaling, the UE that the first subcarrier spacing is the subcarrier spacing used for a control channel, a data channel, or a reference signal; or the transmitter 1202 is specifically configured to notify, by using signaling carried in a control channel, the UE that the first subcarrier spacing is the parameter used for a data channel and/or the subcarrier spacing used for a reference signal.

Optionally, the transmitter 1202 is specifically configured to notify the UE of the first subcarrier spacing by sending at least one piece of the following information to the UE: a value of the first subcarrier spacing; a relative relationship between the first subcarrier spacing and a current subcarrier spacing of the UE; a relative relationship between the first subcarrier spacing and a common reference subcarrier spacing; and a relative relationship between the first subcarrier spacing and a subcarrier spacing used for a preset channel.

Optionally, the transmitter 1202 is further configured to notify the base station of effective time of the first subcarrier spacing and/or an effective channel of the first subcarrier spacing.

The base station provided in Embodiment 9 of this application may execute the parameter determining method executed by the base station in Embodiment 1 or Embodiment 2. For a specific implementation process and beneficial effects thereof, refer to the foregoing embodiment. Details are not described herein again.

Figure 13:
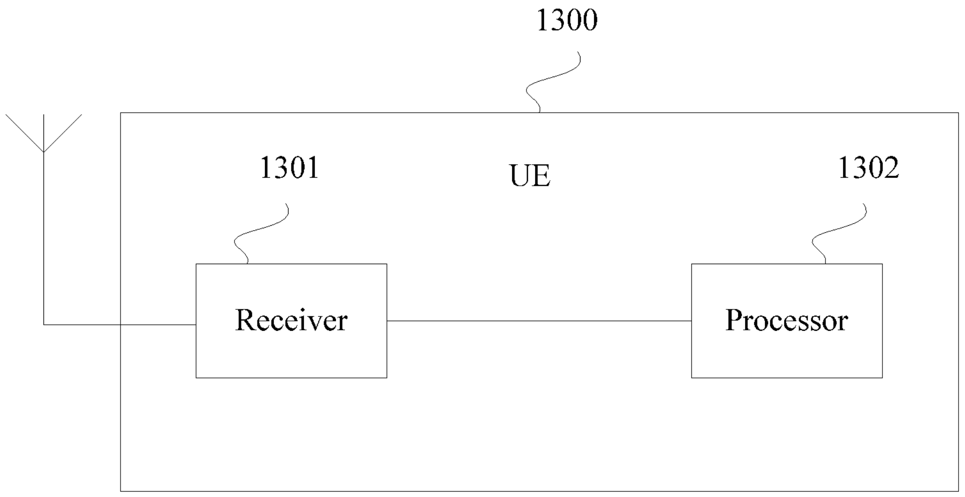
FIG. 13 is a schematic structural diagram of UE according to Embodiment 10 of this application.

Embodiment 10 of this application further provides UE. FIG. 13 is a schematic structural diagram of UE according to Embodiment 10 of this application. As shown in FIG. 13, the UE 1300 may include a receiver 1301 and a processor 1302. The receiver 1301 is connected to the processor 1302.

The receiver 1301 is configured to obtain a first subcarrier spacing notified by a base station.

The processor 1302 is configured to perform data transmission with the base station based on the first subcarrier spacing.

Optionally, the UE 1300 further includes: a transmitter, configured to send a random access channel to the base station by using a second subcarrier spacing, so that the base station determines the first subcarrier spacing based on the second subcarrier spacing.

Optionally, the UE 1300 further includes: a transmitter, configured to send a request to the base station, where the request includes indication information corresponding to a subcarrier spacing requested by the UE, and the request is used by the base station to determine the first subcarrier spacing based on the indication information corresponding to the subcarrier spacing requested by the UE.

Optionally, the first subcarrier spacing is a subcarrier spacing determined by the base station based on a reference signal measurement value corresponding to at least one subcarrier spacing.

Optionally, the receiver 1301 is further configured to obtain a cyclic prefix CP type notified by the base station, where the CP type is a CP type determined by the base station based on a reference signal measurement value corresponding to at least one CP type.

Optionally, the UE 1300 further includes: a transmitter, configured to send, to the base station, at least one of the reference signal measurement value corresponding to the at least one subcarrier spacing.

Optionally, the receiver 1301 is further configured to receive a reference signal that is corresponding to the at least one subcarrier spacing and that is sent by the base station.

Optionally, a reference signal measurement value corresponding to each subcarrier spacing in the at least one subcarrier spacing is obtained by detecting, by the base station, a reference signal corresponding to each subcarrier spacing.

Optionally, the UE 1300 further includes: a transmitter, configured to send, to the base station, a reference signal corresponding to the at least one subcarrier spacing.

Optionally, the first subcarrier spacing includes a subcarrier spacing used for a channel, and the subcarrier spacing used for a channel includes at least one of the following: a subcarrier spacing used for a synchronization signal, a subcarrier spacing used for a broadcast channel, a subcarrier spacing used for a control channel, a subcarrier spacing used for a random access channel, a subcarrier spacing used for a data channel, and a subcarrier spacing used for a reference signal.

Optionally, the first subcarrier spacing is a subcarrier spacing determined by the base station based on a third subcarrier spacing and a relationship between the third subcarrier spacing and the first subcarrier spacing, where the third subcarrier spacing is a subcarrier spacing used for a first channel, the first subcarrier spacing is a subcarrier spacing used for a second channel, and the first channel and the second channel are different channels.

Optionally, the first channel and the second channel are two different channels of the following: a synchronization signal, a broadcast channel, a random access channel, a control channel, a data channel, and a reference signal.

Optionally, the processor 1302 is further configured to determine, based on signaling that is carried in a broadcast channel and that is sent by the base station, that the first subcarrier spacing is the parameter used for a data channel; or the processor 1302 is further configured to determine, based on signaling that is carried in a broadcast channel or system information and that is sent by the base station, that the first subcarrier spacing is the parameter used for a control channel or the parameter used for a random access channel; or the processor 1302 is further configured to determine, based on higher layer signaling sent by the base station, that the first subcarrier spacing is the parameter used for a control channel, a data channel, or a reference signal; or the processor 1302 is further configured to determine, based on signaling that is carried in a control channel and that is sent by the base station, that the first subcarrier spacing is the parameter used for a data channel and/or the parameter used for a reference signal.

Optionally, the processor 1302 is further configured to determine the first subcarrier spacing based on at least one piece of the following information sent by the base station: a value of the first parameter, a relative relationship between the first parameter and a current parameter of the UE, a relative relationship between the first parameter and a common reference parameter, and a relative relationship between the first parameter and a parameter used for a preset channel.

Optionally, the receiver 1301 is further configured to obtain effective time of the first subcarrier spacing and/or an effective channel of the first subcarrier spacing that are/is notified by the base station.

The UE provided in Embodiment 10 of this application may execute the parameter determining method executed by the UE in Embodiment 1 or Embodiment 2. For a specific implementation process and beneficial effects thereof, refer to the foregoing embodiment. Details are not described herein again.

Figure 14:
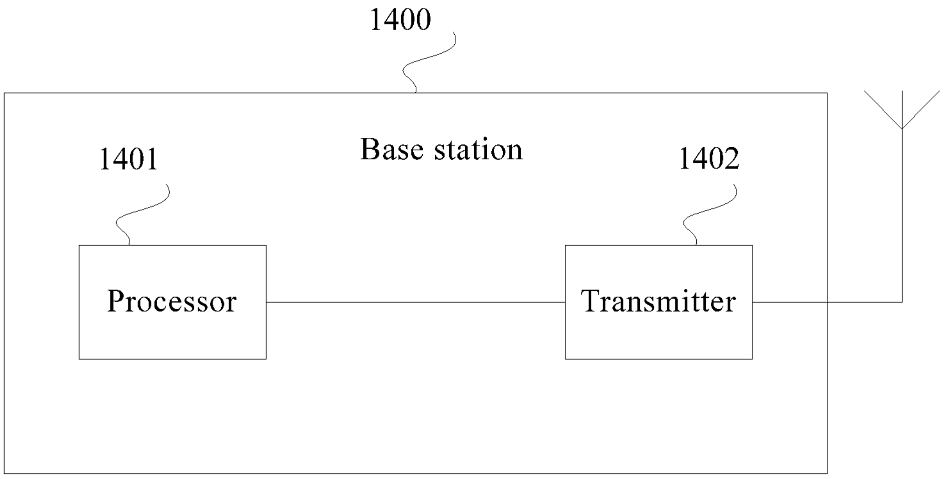
FIG. 14 is a schematic structural diagram of a base station according to Embodiment 11 of this application.

Embodiment 11 of this application further provides a base station. FIG. 14 is a schematic structural diagram of a base station according to Embodiment 11 of this application. As shown in FIG. 14, the base station 1400 includes a processor 1401 and a transmitter 1402. The processor 1401 is connected to the transmitter 1402.

The processor 1401 is configured to: determine a synchronization signal frequency raster; determine a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal; and determine a synchronization signal frequency domain location based on the set of synchronization signal frequency domain locations.

The transmitter 1402 is configured to send a synchronization signal to user equipment at the synchronization signal frequency domain location.

Optionally, the processor 1401 is specifically configured to determine the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal; and the processor 1401 is specifically configured to independently determine a frequency raster of each synchronization signal based on a subcarrier spacing of the synchronization signal; or the processor 1401 is specifically configured to determine frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the processor 1401 is specifically configured to determine the set of synchronization signal frequency domain locations based on a synchronization signal bandwidth.

Optionally, the processor 1401 is specifically configured to determine the set of synchronization signal frequency domain locations based on a center frequency, a highest frequency, or a lowest frequency of a transmission frequency band on which a synchronization signal is located.

Optionally, the base station 1400 further includes: a receiver, configured to send configuration information on another transmission frequency band, so that the user equipment determines a set of candidate synchronization signal locations or the synchronization signal frequency raster, where the configuration information is used to configure the set of synchronization signal frequency domain locations on an operation frequency band on which the synchronization signal is located; or a receiver, configured to send configuration information to the user equipment by using another base station, so that the user equipment determines a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

The base station provided in Embodiment 11 of this application may execute the signal transmission method executed by the base station in Embodiment 3. For a specific implementation process and beneficial effects thereof, refer to the foregoing embodiment. Details are not described herein again.

Figure 15:
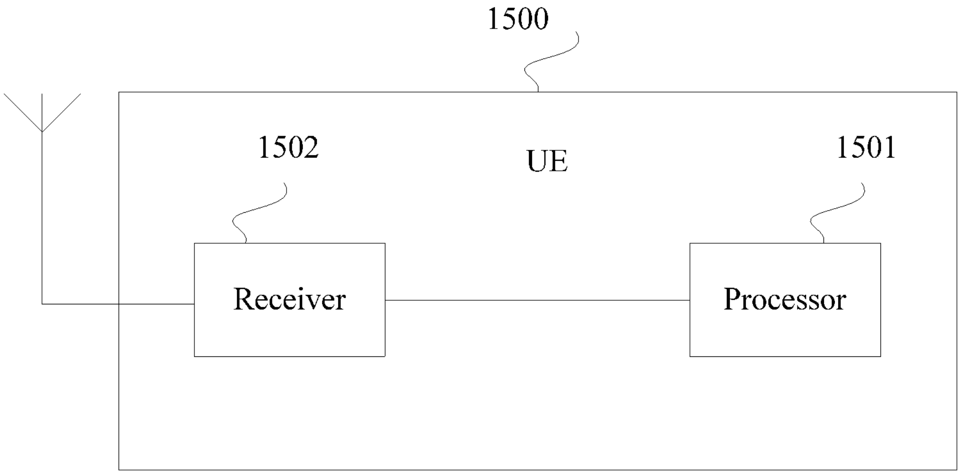
FIG. 15 is a schematic structural diagram of UE according to Embodiment 12 of this application.

Embodiment 12 of this application further provides UE. FIG. 15 is a schematic structural diagram of UE according to Embodiment 12 of this application. As shown in FIG. 15, the UE 1500 includes a processor 1501 and a receiver 1502. The processor 1501 is connected to the receiver 1502.

The processor 1501 is configured to: determine a synchronization signal frequency raster, and determine a set of synchronization signal frequency domain locations based on the synchronization signal frequency raster and a relationship between the synchronization signal frequency raster and a frequency domain location that can be used to send a synchronization signal, where the set of synchronization signal frequency domain locations is a set of frequency domain locations for sending a synchronization signal or a set of frequency domain locations that can be used to send a synchronization signal.

The receiver 1502 is configured to detect a synchronization signal based on the set of synchronization signal frequency domain locations.

Optionally, the processor 1501 is specifically configured to determine the synchronization signal frequency raster based on a synchronization signal subcarrier spacing and/or a synchronization signal carrier frequency, where the synchronization signal subcarrier spacing includes a subcarrier spacing that may be used to transmit a synchronization signal or a subcarrier spacing used on a current transmission frequency band.

Optionally, the synchronization signal is a group of synchronization signals that include at least one synchronization signal, and the processor 1501 is specifically configured to independently determine a frequency raster of each synchronization signal based on a subcarrier spacing of the synchronization signal; or the processor 1501 is specifically configured to determine frequency rasters of all synchronization signals in the group of synchronization signals based on a subcarrier spacing of one synchronization signal in the group of synchronization signals.

Optionally, a minimum value of a frequency difference between the synchronization signal frequency and a frequency of the synchronization signal frequency raster is a predefined determined value.

Optionally, the processor 1501 is specifically configured to determine the set of synchronization signal frequency domain locations based on a synchronization signal bandwidth.

Optionally, the processor 1501 is specifically configured to determine the set of synchronization signal frequency domain locations based on a center frequency, a highest frequency, or a lowest frequency of a transmission frequency band on which a synchronization signal is located.

Optionally, the receiver 1502 is further configured to receive configuration information on another transmission frequency band, to determine a set of candidate synchronization signal locations or the synchronization signal frequency raster, where the configuration information is used to configure the set of synchronization signal frequency domain locations on an operation frequency band on which the synchronization signal is located; or the receiver 1502 is configured to receive configuration information from another base station, to determine a set of candidate synchronization signal locations or the synchronization signal frequency raster, where the configuration information is used to configure the set of candidate synchronization signal locations or the synchronization signal frequency raster on an operation frequency band of the base station that sends the synchronization signal, and the another base station is a base station other than the base station that sends the synchronization signal.

The UE provided in Embodiment 12 of this application may execute the signal transmission method executed by the user equipment in Embodiment 4. For a specific implementation process and beneficial effects thereof, refer to the foregoing embodiment. Details are not described herein again.

In the several embodiments provided in this application, it should be understood that the disclosed apparatus and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

It may be clearly understood by a person skilled in the art that, for the purpose of convenient and brief description, division of the foregoing function modules is only used as an example for description. In actual application, the foregoing functions can be allocated to different function modules for implementation based on a requirement, that is, an inner structure of an apparatus is divided into different function modules to implement all or some of the functions described above. For a detailed working process of the foregoing apparatus, refer to a corresponding process in the foregoing method embodiments. Details are not described herein again.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in this application essentially, or the part contributing to the prior art, or all or some of the technical solutions may be implemented in a form of a software product. The software product is stored in a storage medium and includes several instructions for instructing a computer device (which may be a personal computer, a server, a network device, or the like) or a processor to perform all or some of the steps of the methods described in the embodiments of this application. The storage medium includes: any medium that can store program code, such as a USB flash drive, a removable hard disk, a read-only memory (ROM), a random access memory (RAM), a magnetic disk, or an optical disc.

What is claimed is:

1. A method, comprising:

receiving, by a terminal, first information indicating a first subcarrier spacing from a base station, wherein the first subcarrier spacing is to be used to communicate using a common channel, and wherein the first information is carried in a broadcast channel;

receiving, by the terminal, second information indicating a second subcarrier spacing from the base station, wherein the second information is comprised in system information that is received using a physical downlink shared channel, the second subcarrier spacing is to be used to communicate using a random access channel, and the second subcarrier spacing is a subcarrier spacing of 15 kilohertz (kHz), 30 kHz, 60 kHz or 120 kHz; and communicating, by the terminal, with the base station using the first subcarrier spacing, and the second subcarrier spacing.

2. The method according to claim 1, wherein the common channel is a common control channel scrambled by a paging radio network temporary identifier (RNTI) or a system information RNTI.

3. The method according to claim 1, wherein a correspondence between the first subcarrier spacing and a carrier frequency of the terminal is a first correspondence.

4. The method according to claim 1, wherein the first subcarrier spacing corresponds to a service type of the terminal.

5. The method according to claim 1, wherein a correspondence between the second subcarrier spacing and a carrier frequency of the terminal is a second correspondence.

6. The method according to claim 1, wherein the second subcarrier spacing corresponds to a service type used by the terminal.

7. An apparatus, comprising:

a processor; and a non-transitory memory coupled to the processor for storing program instructions, wherein the program instructions, when executed by the processor, cause the apparatus to:

receive first information indicating a first subcarrier spacing from a base station, wherein the first information is carried in a broadcast channel, and wherein the first subcarrier spacing is to be used to communicate using a common channel;

receive second information indicating a second subcarrier spacing from the base station, wherein the second information is comprised in system information that is received using a physical downlink shared channel, the second subcarrier spacing is to be used to communicate using a random access channel, and the second subcarrier spacing is a subcarrier spacing of 15 kilohertz (kHz), 30 kHz, 60 kHz or 120 kHz; and communicate with the base station using the first subcarrier spacing and the second subcarrier spacing.

8. The apparatus according to claim 7, wherein the common channel is a common control channel scrambled by a paging radio network temporary identifier (RNTI) or a system information RNTI.

9. The apparatus according to claim 7, wherein there a correspondence between the first subcarrier spacing and a carrier frequency of a terminal comprising the apparatus is a first correspondence.

10. The apparatus according to claim 7, wherein the first subcarrier spacing corresponds to a service type used by a terminal comprising the apparatus.

11. The apparatus according to claim 7, wherein a correspondence between the second subcarrier spacing and a carrier frequency of a terminal comprising the apparatus is a second correspondence.

12. The apparatus according to claim 7, wherein the second subcarrier spacing corresponds to a service type of a terminal comprising the apparatus.

13. A terminal, comprising:

a receiver, configured to:

receive first information indicating a first subcarrier spacing from a base station, wherein the first subcarrier spacing is to be used to communicate using a common channel, and the first information is carried in a broadcast channel;

receive second information indicating a second subcarrier spacing from the base station, wherein the second information is comprised in system information that is received using a physical downlink shared channel, and the second subcarrier spacing is to be used to communicate using a random access channel, and the second subcarrier spacing is a subcarrier spacing of 15 kilohertz (kHz), 30 kHz, 60 kHz or 120 kHz; and a processor, configured to communicate with the base station using the first subcarrier spacing and the second subcarrier spacing.

14. The terminal according to claim 13, wherein the common channel is a common control channel scrambled by a paging radio network temporary identifier (RNTI) or a system information RNTI.

15. The terminal according to claim 13, wherein a correspondence between the first subcarrier spacing and a carrier frequency of the terminal is a first correspondence.

16. The terminal according to claim 13, wherein the first subcarrier spacing corresponds to a service type of the terminal.

17. The terminal according to claim 13, wherein a correspondence between the second subcarrier spacing and a carrier frequency of the terminal is a second correspondence.

18. The terminal according to claim 13, wherein the second subcarrier spacing corresponds to a service type of the terminal.

19. A non-transitory computer-readable medium storing program, wherein the program comprises instructions for:

receiving first information indicating a first subcarrier spacing from a base station, wherein the first subcarrier spacing is to be used to communicate using a common channel, and the first information is carried in a broadcast channel;

receiving second information indicating a second subcarrier spacing from the base station, wherein the second information is comprised in system information that is received using a physical downlink shared channel, the second subcarrier spacing is to be used to communicate using a random access channel, and the second subcarrier spacing is a subcarrier spacing of 15 kilohertz (kHz), 30 kHz, 60 kHz or 120 kHz; and communicating with the base station using the first subcarrier spacing and the second subcarrier spacing.

* * * * *